(12) United States Patent
Bobel et al.

(10) Patent No.: US 11,939,002 B2
(45) Date of Patent: Mar. 26, 2024

(54) STRUCTURAL ASSEMBLY WITH PATTERNED PANELS

(71) Applicant: GM GLOBAL TECHNOLOGY OPERATIONS LLC, Detroit, MI (US)

(72) Inventors: Andrew Clay Bobel, Troy, MI (US); Louis G. Hector, Jr., Shelby Township, MI (US); Erik Brandon Golm, Warren, MI (US); Charles E. Jensen, Shelby Township, MI (US); Charles W. Toohy, Waterford, MI (US); Mohamed Darsot, Detroit, MI (US); Zachary S. Mendla, Shelby Township, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 17/388,799

(22) Filed: Jul. 29, 2021

(65) Prior Publication Data

US 2023/0029479 A1    Feb. 2, 2023

(51) Int. Cl.
*B62D 25/20*     (2006.01)
*B60R 13/08*     (2006.01)
(Continued)

(52) U.S. Cl.
CPC ........ *B62D 25/2009* (2013.01); *B60R 13/083* (2013.01); *B60R 16/04* (2013.01);
(Continued)

(58) Field of Classification Search
CPC .. B62D 25/2009; B62D 27/026; B62D 27/06; B62D 27/02; B62D 25/20; B60R 13/083; B60R 16/04; Y02E 60/10
(Continued)

(56) References Cited

U.S. PATENT DOCUMENTS 4,631,891 A * 12/1986 Donavich .......... B62D 25/2054
                                                    296/204
9,283,895 B2 * 3/2016 Sumi ........................ B32B 5/18
(Continued)

FOREIGN PATENT DOCUMENTS

CN         115692981 A      2/2023
CN         115958947 A      4/2023
(Continued)

OTHER PUBLICATIONS

Bobel, Andrew Clay et al., U.S. Appl. No. 17/323,041, filed May 18, 2021 entitled "Sheet Metal Assembly Having One Stiffening Members With a Predetermined Draw Depth, " 26 pages.
(Continued)

*Primary Examiner* — Amy R Weisberg
*Assistant Examiner* — Dana D Ivey
(74) *Attorney, Agent, or Firm* — Harness, Dickey & Pierce, P.L.C.

(57) ABSTRACT

A structural assembly includes a frame and a plurality of panels. The frame includes a wall that at least partially defines an interior region. The plurality of panels is disposed at least partially in the interior region and is coupled to the frame. The plurality of panels includes a first panel and a second panel. The first panel includes a first surface and a second surface opposite the first surface. The first surface defines a first plurality of depressions and the second surface defines a first plurality of protrusions complementary to the first plurality of depressions. The second panel includes a third surface and a fourth surface opposite the third surface. The third surface defines a second plurality of depressions. The fourth surface defines a second plurality of protrusions complementary to the first plurality of depressions. The first panel is coupled to the second panel.

20 Claims, 24 Drawing Sheets

(51) Int. Cl.
    *B60R 16/04* (2006.01)
    *B62D 27/02* (2006.01)
    *B62D 27/06* (2006.01)

(52) U.S. Cl.
    CPC ............ *B62D 27/026* (2013.01); *B62D 27/06* (2013.01); *B62D 25/20* (2013.01); *B62D 27/02* (2013.01); *Y02E 60/10* (2013.01)

(58) Field of Classification Search
    USPC ...... 296/193.07, 186.1, 184, 1, 24.35, 187.1
    See application file for complete search history.

(56) References Cited

U.S. PATENT DOCUMENTS

| | | | | |
|---|---|---|---|---|
| 10,549,795 | B2 * | 2/2020 | Ehrlich | ............ B62D 25/2054 |
| 11,549,626 | B2 | 1/2023 | Sachdev et al. | |
| 2022/0376338 | A1 | 11/2022 | Bobel et al. | |
| 2023/0029479 | A1 | 2/2023 | Bobel et al. | |
| 2023/0113832 | A1 | 4/2023 | Bobel et al. | |

FOREIGN PATENT DOCUMENTS

| | | |
|---|---|---|
| DE | 102022109383 A1 | 2/2023 |
| DE | 102022122358 A1 | 4/2023 |

OTHER PUBLICATIONS

Bobel, Andrew C. et al, U.S. Appl. No. 17/695,070, filed Mar. 15, 2022 entitled "Battery Cell Pack," 22 pages.
Bobel, Andrew Clay et al, U.S. Appl. No. 18/307,486, filed Apr. 26, 2023 entitled "Patterned Two Sheet Shear Panel Constructions," 30 pages.
Bobel, Andrew Clay et al, U.S. Appl. No. 18/307,468, filed Apr. 26, 2023 entitled "Stackable Battery Module Mounting System," 26 pages.
Bobel, Andrew Clay et al, U.S. Appl. No. 18/356,765, filed Jul. 21, 2023 entitled "Hollow Copper Thermal Conductors," 22 pages.
CN 115692981-A is a publication of counterpart Chinese Patent Application No. 202210587287.7 to the present application.
U.S. Appl. No. 17/323,041, filed May 18, 2021, Andrew Clay Bobel et al.
U.S. Appl. No. 17/500,641, filed Oct. 13, 2021, Andrew Clay Bobel et al.
U.S. Appl. No. 18/307,486, filed Apr. 26, 2023, Andrew Clay Bobel et al.

* cited by examiner

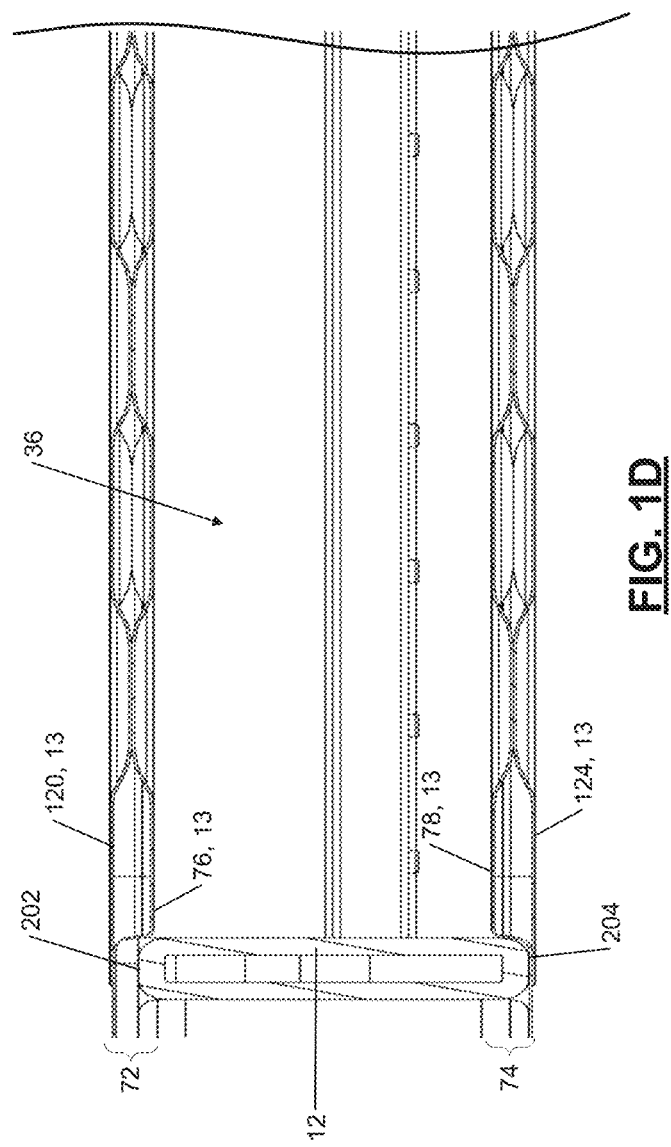

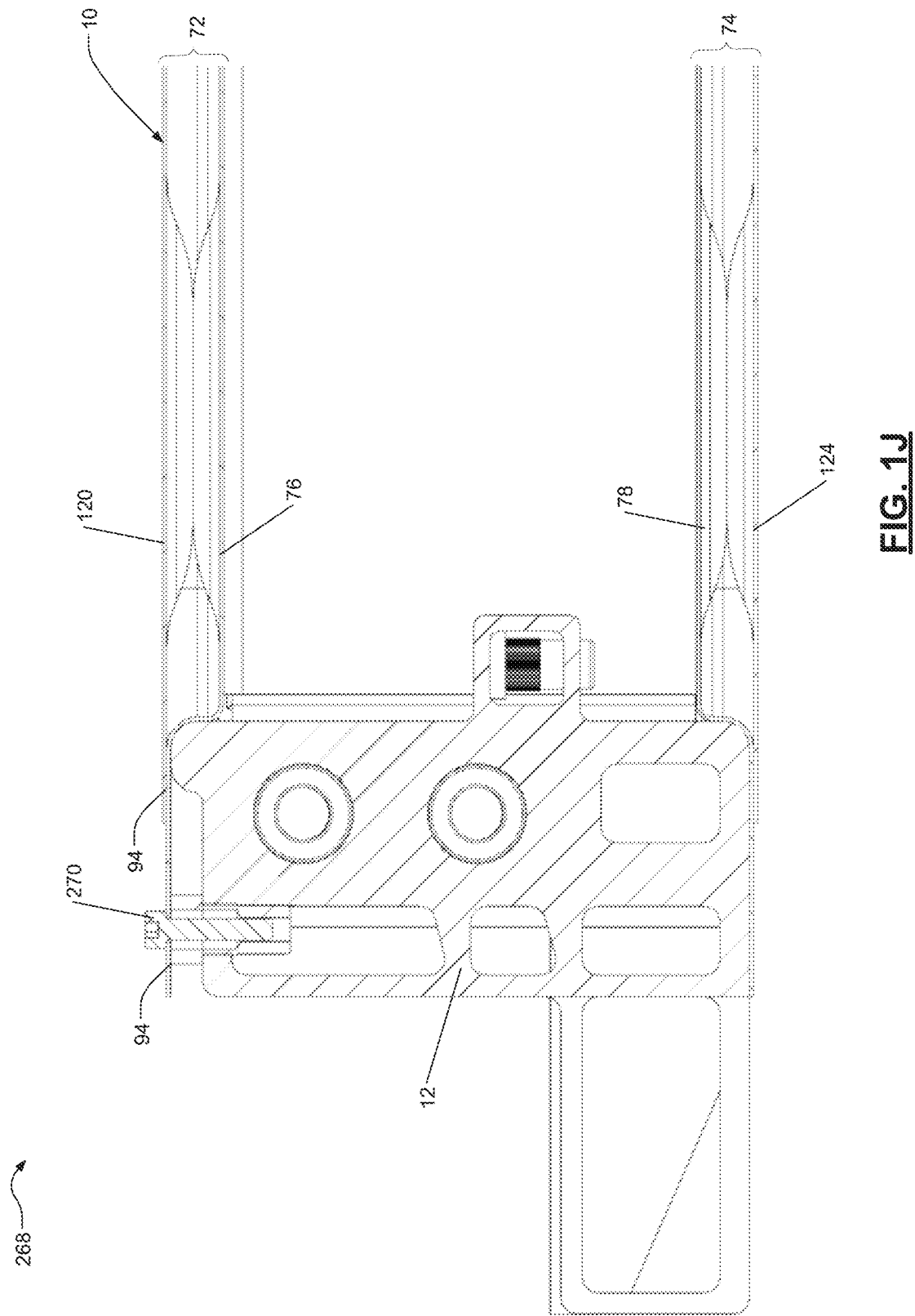

STRUCTURAL ASSEMBLY WITH PATTERNED PANELS

INTRODUCTION

This section provides background information related to the present disclosure which is not necessarily prior art.

The present disclosure relates to a structural assembly for a vehicle, and methods of manufacturing and assembling the structural assembly.

Vehicle structural assemblies provide structural support and mounting locations for other vehicle components. It is advantageous to improve the strength and structural performance of vehicle components. However, it is also advantageous that components of automobiles or other vehicles be lightweight to improve efficiency. Thus, vehicle components, such as structural assemblies, that exhibit both adequate strength during normal service and energy-absorption characteristics under extraordinary conditions such as collisions, while minimizing component weight are advantageous.

SUMMARY

This section provides a general summary of the disclosure, and is not a comprehensive disclosure of its full scope or all of its features.

In various aspects, the present disclosure provides a structural assembly including a frame and a plurality of panels. The frame includes a wall at least partially defining an interior region. The plurality of panels is disposed at least partially in the interior region. The plurality of panels is coupled to the frame. The plurality of panels includes a first panel and a second panel. The first panel includes a first surface and a second surface opposite the first surface. The first surface defines a first plurality of depressions and the second surface defines a first plurality of protrusions. The first plurality of protrusions are complementary to the first plurality of depressions. The second panel includes a third surface and a fourth surface opposite the third surface. The third surface defines a second plurality of depressions. The fourth surface defines a second plurality of protrusions. The second plurality of protrusions are complementary to the second plurality of depressions. The first panel is coupled to the second panel.

In one aspect, the plurality of panels has a first compressive strength in a first direction and a second compressive strength in a second direction. The plurality of panels is configured to support an external load. The external load has a force that is greater than or equal to about 10 kN.

In one aspect, the first plurality of depressions and the first plurality of protrusions define a first pattern. The second plurality of depressions and the second plurality of protrusions define a second pattern.

In one aspect, at least one of the first pattern and the second pattern defines at least two planes of symmetry.

In one aspect, the first pattern is different from the second pattern.

In one aspect, the structural assembly further includes a third panel. The third panel is disposed at least partially in the interior region. The third panel is coupled to the frame. The third panel includes a fifth surface and a sixth surface. The fifth surface defines a third plurality of depressions. The sixth surface defines a third plurality of protrusions. The third plurality of protrusions are complementary to the third plurality of depressions.

In one aspect, the structural assembly further includes a fourth panel. The fourth panel is disposed at least partially in the interior region. The fourth panel is coupled to the frame. The fourth panel includes a seventh surface and an eighth surface. The seventh surface defines a fourth plurality of depressions. The eighth surface defines a fourth plurality of protrusions. The fourth plurality of protrusions are complementary to the fourth plurality of depressions. The fourth panel is coupled to the third panel.

In one aspect, the first panel and the second panel cooperate to define a floor. The third panel and the fourth panel cooperate to define a cover. The floor and cover are spaced apart and cooperate with the frame to define an interior compartment.

In one aspect, an electrochemical device assembly includes the structural assembly. The electrochemical device assembly further includes an electrochemical device. The cover, the floor, and the frame cooperate to define an interior compartment. The electrochemical device is disposed in the interior compartment.

In one aspect, the electrochemical device is coupled to at least one of the cover and the floor.

In one aspect, the electrochemical device is coupled to the cover and the floor is removable.

In one aspect, the plurality of panels is coupled to the frame by: a clamp, a weld, adhesive, a mechanical fastener, or any combination thereof.

In one aspect, the first panel and the second panel cooperate to define a cavity.

In one aspect, the cavity is configured to vent a fluid.

In one aspect, the structural assembly further includes a material disposed in the cavity. The material is selected from the group consisting of: a thermal barrier, a noise insulating material, a stiffening material, or a combination thereof.

In one aspect, the first panel and the second panel includes a high-strength steel, a high-strength aluminum, or both a high-strength steel and a high-strength aluminum.

In one aspect, each of the panels of the plurality of panels has an average thickness that is greater than or equal to about 0.5 mm to less than or equal to about 5 mm. Each of the first plurality of depressions and the second plurality of depressions has a maximum depth that is greater than equal to about 1 mm to less than or equal to about 10 mm.

In various aspects, the present disclosure provides a method of manufacturing a structural assembly. The method includes forming a plurality of panels. The forming includes hot stamping. The plurality of panels includes a first panel defining a first surface pattern, a second panel defining a second surface pattern, a third panel defining a third surface pattern, and a fourth panel defining a fourth surface pattern. The method includes forming a floor by welding the first panel to the second panel. The method includes forming a cover by welding the third panel to the fourth panel. The method includes coupling the cover and the floor to a frame. The coupling includes a mechanical fastener. The cover and the floor are spaced apart to at least partially define an interior compartment.

In one aspect, the method further includes disposing an electrochemical device in the interior compartment.

In one aspect, the method further includes directly coupling the electrochemical device to exactly one of the cover and the floor. The other of the cover and the floor is removable.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1D is a partial cross-sectional view of the structural subassembly of FIG. 1C;

FIG. 1I is a partial cross-sectional view a structural assembly including the subassembly of FIG. 1A according to various aspects of the present disclosure;

FIG. 1J is a partial cross-sectional view of another structural assembly including the subassembly of FIG. 1A according to various aspects of the present disclosure;

Corresponding reference numerals indicate corresponding parts throughout the several views of the drawings.

DETAILED DESCRIPTION

Figure 1A:
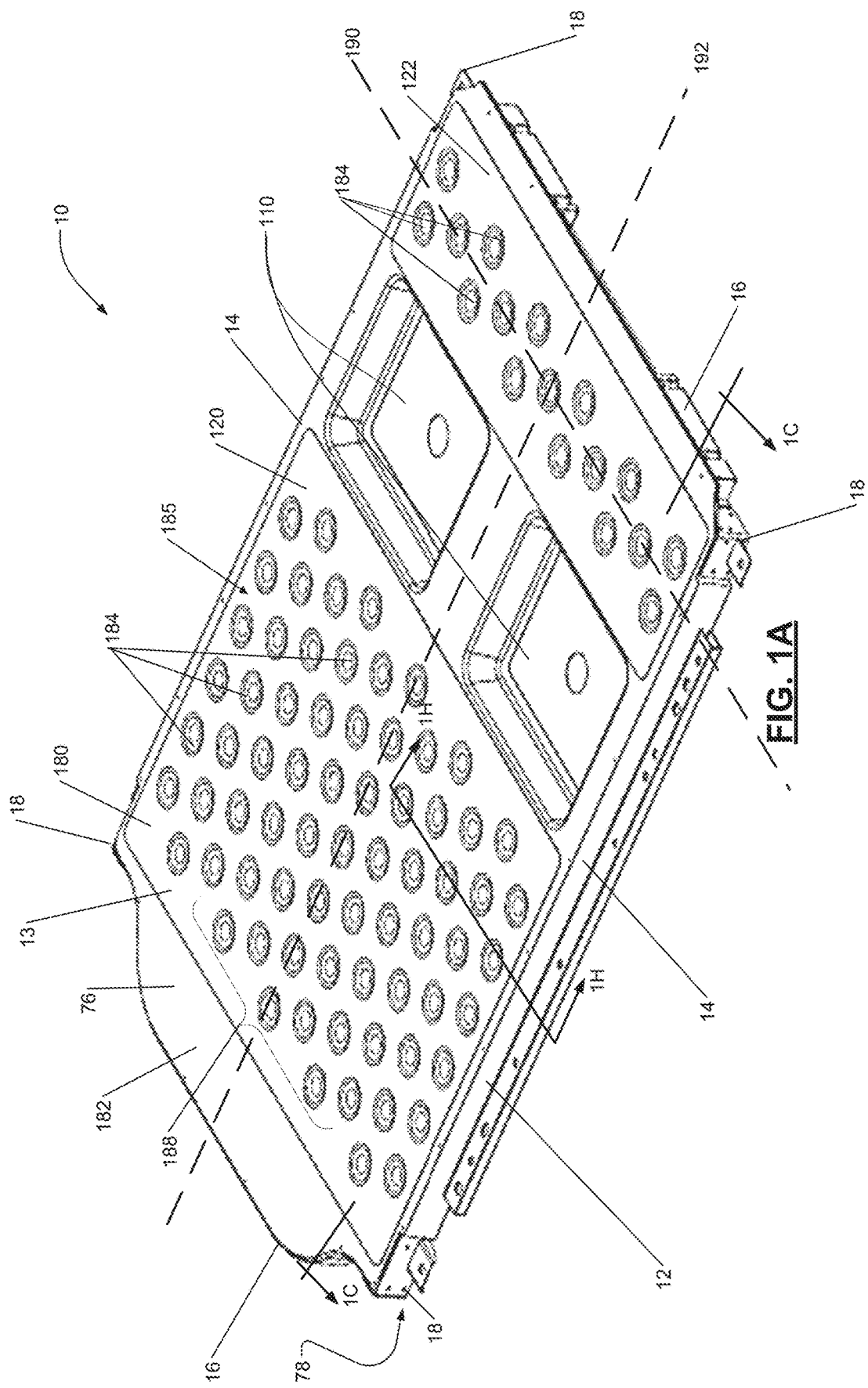
FIG. 1A is a perspective view of a structural subassembly including a frame and a plurality of panels according to various aspects of the present disclosure.
Figure 1B:
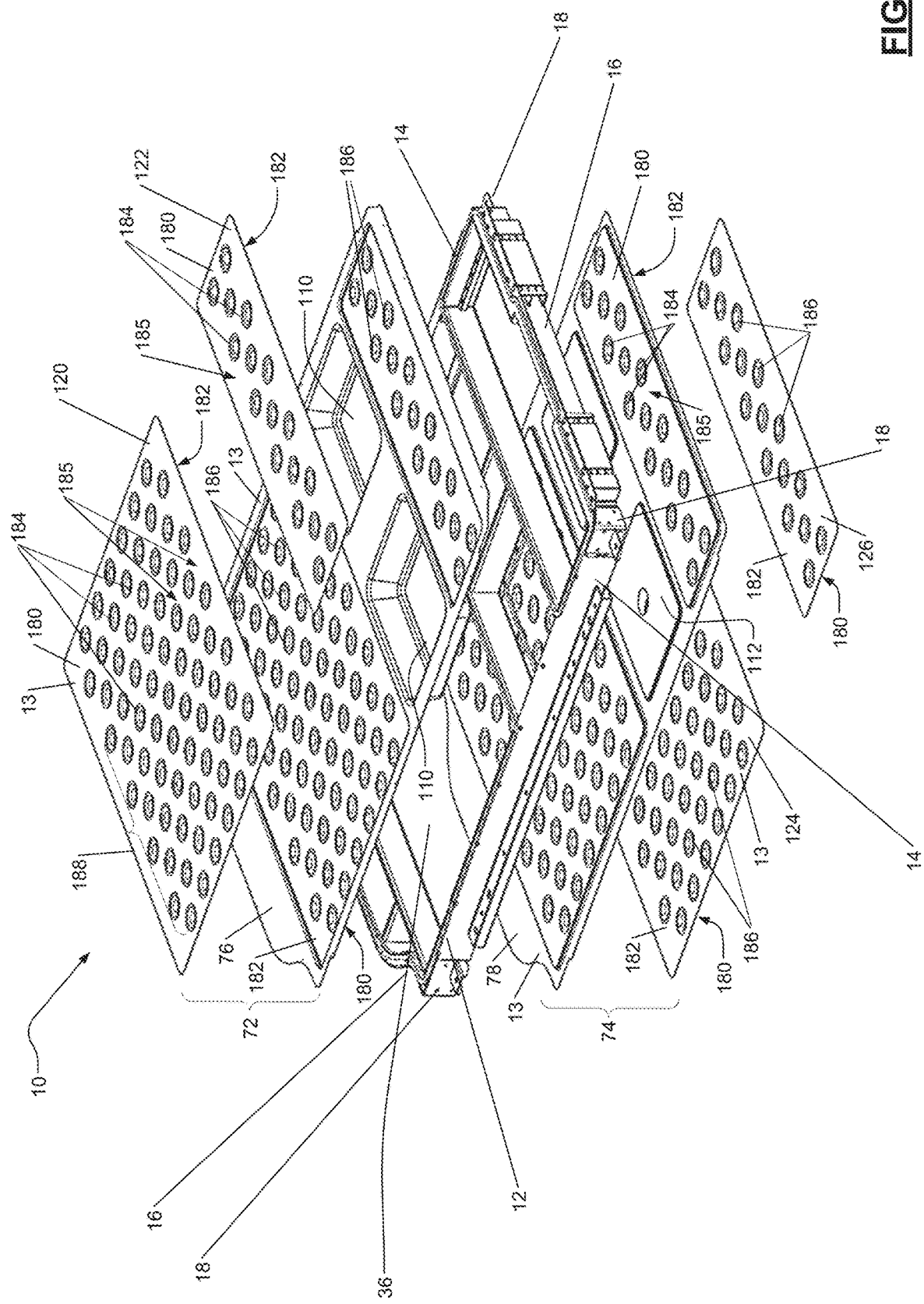
FIG. 1B is an exploded view of the structural subassembly of FIG. 1A.
Figure 1C:
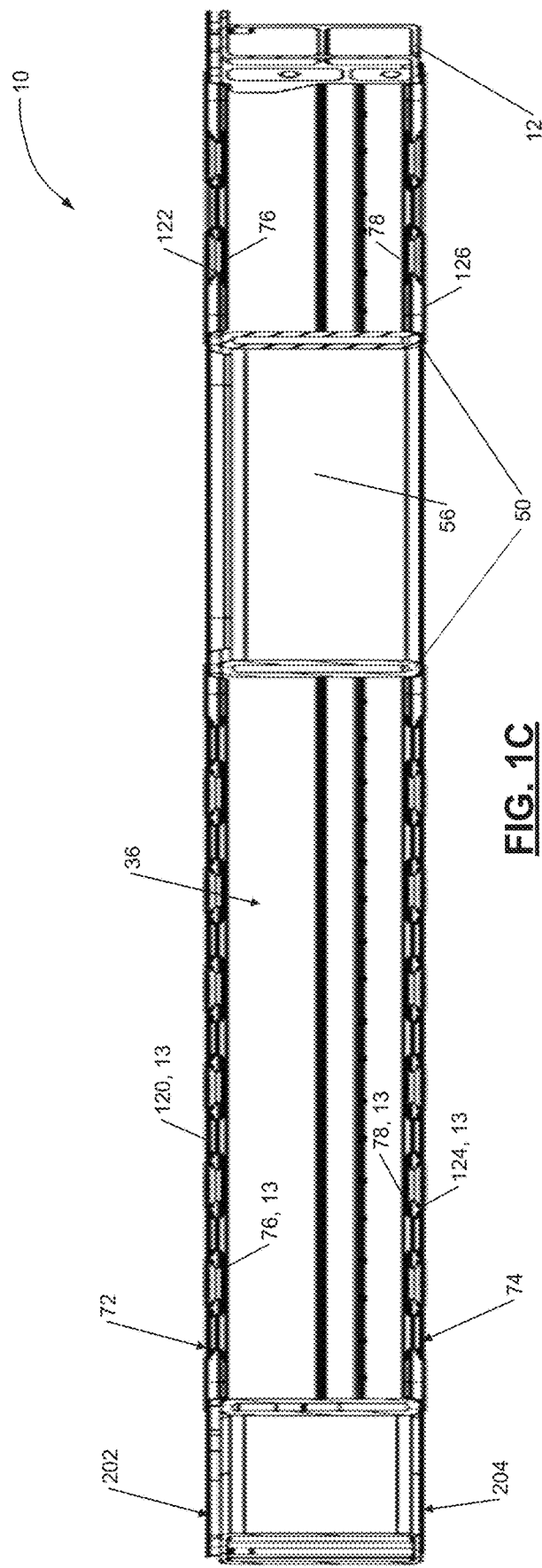
FIG. 1C is a cross-sectional view of the structural subassembly of FIG. 1A taken at line 1C-1C of FIG. 1A.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Structural assemblies may be used in vehicles to provide structural support and/or mounting locations for other vehicle components. Structural assemblies may include energy-absorbing components that absorb collision energy through controlled deformation. Structural assemblies may be constructed from metal, such as aluminum or steel, and/or a polymer composite material. Metal structural assemblies may absorb energy when elastically and/or plastically deforming without fracture. Lower strength metals may be assembled to additional reinforcement components to achieve a desired strength. Some structural assemblies utilize cross member components to achieve a desired energy absorbing performance, such as in side impact collisions.

Some structural assemblies are used to support and/or contain one or more electrochemical devices. Such structural assemblies may include a floor component, a cover component, multiple reinforcement components, and multiple cross member components that are all individually fabricated (e.g., by stamping, roll forming, or extrusion) and joined to one another (e.g., by welding). The electrochemical device, such as a battery module or capacitor, may be fixed to the welded on cross members (e.g., by bolting) and at least partially protected from impact and/or contamination by the structural assembly.

Some structural assemblies may be complex to assemble because of a large quantity of components. Due to the quantity of distinct components, manufacturing and assembling a structural assembly may be intricate, complex, and/or time consuming. Moreover, metal structural assemblies may be heavy, leading to a decreased fuel efficiency and/or decreased battery range in the vehicle.

In some structural assemblies enclosing an electrochemical device, the maintenance, replacement, or repair of the electrochemical device may be a labor intensive process. The cover component may be removably coupled to the structural assembly (e.g., by mechanical fastener). The electrochemical device may be fixed to a cross member that may be attached (e.g., welded) to the floor component and to a frame and/or side components. When the battery module is fixed to the floor, frame, and/or side components, the service of individual electrochemical devices may involve the removal of the entire structural assembly from the vehicle. Due to the weight and quantity of components of the entire structural assembly, the service process may be complex and time-consuming.

In various aspects, the present disclosure provides a paneled structural assembly for a vehicle. The structural assembly may include high-strength metal components, such as high-strength steel. The structural assembly includes a plurality of high strength panels coupled to a frame. The structural assembly includes a first pair of panels in which a first panel is fixed to a second panel (e.g., by welding). The structural assembly may further include a second pair of panels in which a third panel is fixed to a fourth panel (e.g., by welding). Each pair of panels may be removably coupled to the frame (e.g., by a mechanical fastener).

In various aspects, the present disclosure provides a paneled structural assembly for a vehicle that is free of a frame. The structural assembly may include high-strength metal components (e.g., high strength steel). The structural assembly includes a first pair of panels in which a first panel is fixed to a second panel (e.g., by welding).

Each of the panels includes depressions and protrusions that are complementary to the depressions. A profile shape of the depressions and the protrusions may be symmetrical.

In the aggregate, the depressions and complementary protrusions define a pattern on the panel. The pattern may provide the panel with an increased strength in at least one direction compared to a non-patterned panel. The pattern may form at least two planes of symmetry, which provides the panels with an increased strength in at least two directions compared to a non-patterned panel. The patterns of each panel in the assembly may be the same or different, and may be designed to meet desired strength and energy absorbing characteristics of the structural assembly. The paneled structural assembly may be configured to support other vehicle components, such as an electrochemical device. In one example, the paneled structural assembly may include a cover component including a first pair of panels, a floor component including a second pair of panels, and a frame.

The paneled structural assembly that is constructed of a high-strength metal may generally be less complex than other structural assemblies having more components and reinforcements. The symmetrically patterned panels of the paneled structural assembly may exhibit desired strength and energy absorption characteristics without the inclusion of cross members. Due to the increased strength of a high-strength metal, the paneled structural assembly may include fewer reinforcement, cross member, and/or fastening components. The decreased quantity of components compared to typical structural assemblies may also lead to a less complex and/or time-consuming assembly process. Furthermore, the paneled structural assembly may be light weight compared to a structural assembly including reinforcements, cross members, and/or fastening components.

The removably coupled panels enclosing a vehicle component, such as an electrochemical device, may improve ease of serviceability of the component. The component may be attached to one of the cover component or the floor component (e.g., by a mechanical fastener), which may allow the other of the removably coupled floor component or cover component to be removed individually from the structural assembly. In certain aspects, the component may be attached to the cover component (e.g., by a mechanical fastener), which may allow the floor component to be removed individually from the structural assembly. Removal of a mechanically fastened floor or cover component may allow easier and/or quicker access to service the component compared to the removal from a vehicle of an entire structural assembly without removably coupled panels.

Referring to FIGS. 1A-1D, a paneled structural subassembly 10 (also referred to as the "subassembly 10") according to various aspects of the present disclosure is provided. The subassembly 10 includes a frame 12 and a plurality of panels 13. As will be described in greater detail below in FIGS. 1A-1M, the plurality of panels 13 may be coupled to the frame 12.

Figure 1E:
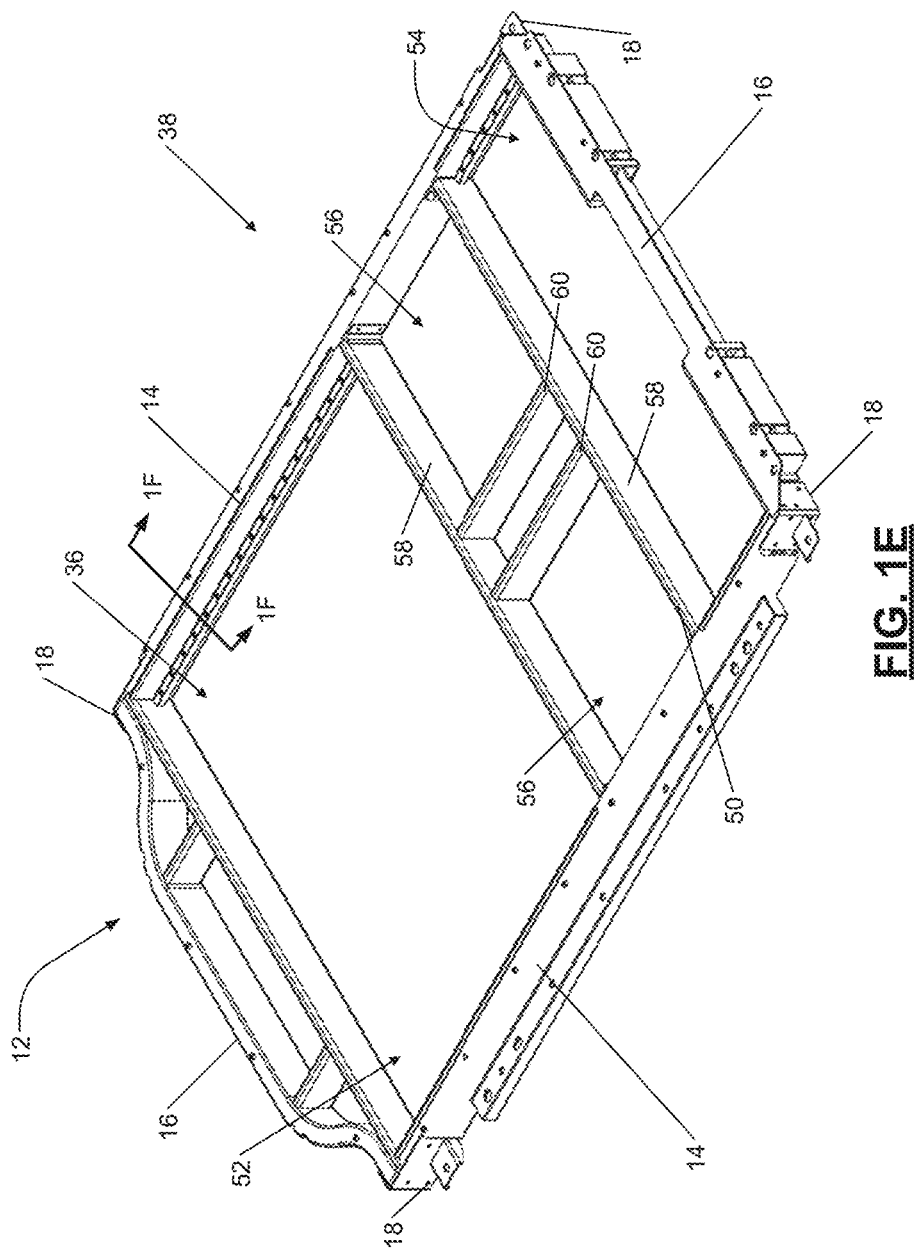
FIG. 1E is a perspective view of the frame of FIG. 1A.

With reference to FIG. 1E, the frame 12 may include a pair of longitudinally-extending sides 14 and a pair of transversely-extending sides 16 (collectively referred to as the "sides 14, 16"). In certain aspects, each of the four sides 14, 16 may be substantially perpendicularly secured to an adjacent side such that the longitudinally-extending sides 14 are substantially perpendicularly secured to the transversely-extending sides 16 at a corner 18. Accordingly, the frame 12 may include four corners 18, with each corner 18 including a joint between one of the longitudinally-extending sides 14 and one of the transversely-extending sides 16. When the subassembly (shown in FIG. 1A) is assembled to a vehicle, the longitudinally-extending sides 14 may extend in a forward-aft direction and the transversely-extending sides 16 may extend in a cross-car direction.

The frame 12 may include or be constructed from a metal. In certain aspects, the metal may include a steel, aluminum (e.g., aluminum or aluminum alloy), or a combination of steel and aluminum. In certain aspects, the frame 12 may include a polymer composite material, either in combination with a metal or alone.

Figure 1F:
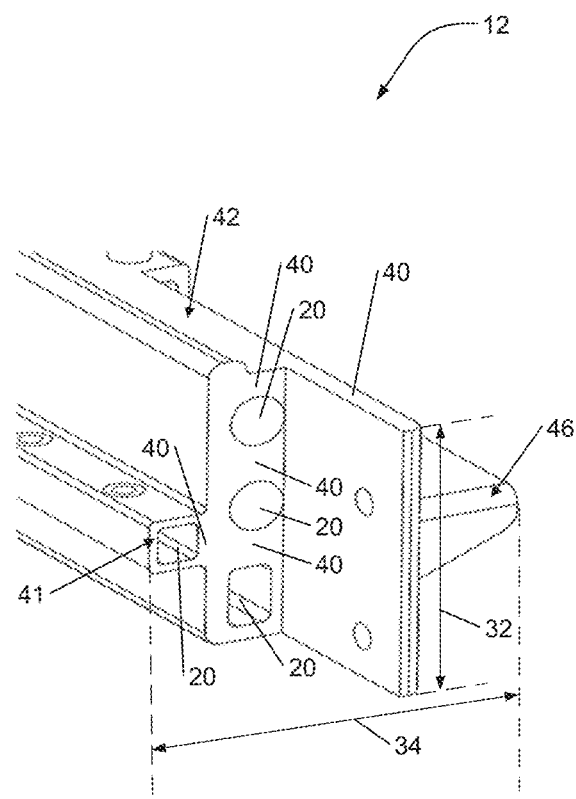
FIG. 1F is a cross-sectional view of the frame of FIG. 1E taken at line 1F-1F of FIG. 1E.

With reference to FIGS. 1E-1F, in certain aspects, the sides 14, 16, may cooperate to define a generally rectangular shape. The sides 14, 16 may include one or more hollow portions 20. Each of the hollow portions 20 may extend along all or a portion of a length of the respective side 14, 16. Each of the sides 14, 16 may be partially hollow, as shown in FIG. 1F. In certain aspects, each of the sides 14, 16 may be substantially hollow (see, e.g., FIGS. 2C-2D).

The sides 14, 16 may be formed using a roll forming method, an extrusion method, or a combination of roll forming and extrusion methods. In certain other aspects, the four sides 14, 16 may be formed using other methods.

Each of the sides, 14, 16 may define a height 32 (e.g., a maximum height) and a width 34 (e.g., a maximum width). In certain aspects, the height 32 is greater than or equal to about 80 mm, optionally greater than or equal to about 90 mm, optionally greater than or equal to about 100 mm, optionally greater than or equal to about 110 mm, optionally greater than or equal to about 120 mm, optionally greater than or equal to about 130 mm, optionally greater than or equal to about 140 mm, optionally greater than or equal to about 150 mm, optionally greater than or equal to about 160 mm, optionally greater than or equal to about 170 mm, optionally greater than or equal to about 180 mm, or optionally greater than or equal to 190 mm. In certain aspects, the height 32 is less than or equal to about 200 mm, optionally less than or equal to about 190 mm, optionally less than or equal to about 180 mm, optionally less than or equal to about 170 mm, optionally less than or equal to 160 mm, optionally less than or equal to 150 mm, optionally less than or equal to 140 mm, optionally less than or equal to about 130 mm, optionally less than or equal to about 120 mm, optionally less than or equal to about 110 mm, optionally less than or equal to about 100 mm, or optionally less than or equal to about 90 mm.

In certain aspects, the width 34 is be greater than or equal to about 80 mm, optionally greater than or equal to about 90 mm, optionally greater than or equal to about 100 mm, optionally greater than or equal to about 110 mm, optionally greater than or equal to about 120 mm, optionally greater than or equal to about 130 mm, or optionally greater than or equal to about 140 mm. In certain aspects, the width 34 is less than or equal to about 150 mm, optionally less than or equal to about 140 mm, optionally less than or equal to about 130 mm, optionally less than or equal to about 120 mm, optionally less than or equal to about 110 mm, optionally less than or equal to about 100 mm, or optionally less than or equal to about 90 mm. The frame 12 may at least partially define an interior region 36 and an exterior region 38.

In certain aspects, each of the sides 14, 16 may include a plurality of walls 40. At least a portion of the walls 40 may at least partially define the hollow portions 20. In certain aspects, each of the sides 14, 16 may include an interior portion 41, a central portion 42, and an exterior portion 46. The interior portion 41 may be disposed closer to the interior region 36 of the frame 12 than the central portion 42 and the exterior portion 46. The exterior portion 46 may be disposed closer to the exterior region 38 of the frame 12 than the central portion 42 and the interior portion 41. The central portion 42 may be between the interior portion 41 and the exterior portion 46. The central portion 42 may be at least partially disposed in between the interior portion 41 and the exterior portion 46 of the frame 12.

In certain aspects, the hollow portions 20 may define substantially rectangular cross-sectional shapes, substantially elliptical cross-sectional shapes, or a combination of cross-sectional shapes. In certain aspects, the walls 40 are integrally formed such that at least some of the hollow portions 20 may share walls with others of the hollow portions 20 (see, e.g., FIGS. 1F and 2C). However, in certain other aspects, the plurality of walls 40 may be joined together to at least partially define the hollow portions 20 (see, e.g., FIG. 2D). The sides 14, 16 may be constructed and/or formed to include different wall 40 and/or hollow portion 20 geometries, features, orientations, and/or material thicknesses as needed to provide structural support and/or strength at desired areas of the vehicle.

As shown in FIG. 1E, in certain aspects, the frame 12 may include a cross member 50. The cross member 50 may be at least partially disposed in the interior region 36 of the frame 12. The cross member 50 may further divide the frame 12 into a first interior section or portion 52 and a second interior section or portion 54. In certain aspects, a frame may include multiple cross members that divide an interior region into more than two portions. In certain other aspects, a frame may be free of a cross member (see, e.g., frame 400 of FIG. 2A).

In certain aspects, the cross member 50 may at least partially define one or more footwell regions 56. In certain aspects, the cross member 50 may include two transversely-extending bars 58, and two longitudinally-extending bars 60. The transversely-extending bars 58 may be substantially perpendicularly secured to the longitudinally-extending sides 14 of the frame 12. The longitudinally-extending bars 60 may be at least partially disposed in between, and secured perpendicularly to each of the two transversely-extending bars 58.

Returning to FIGS. 1A-1B, the subassembly 10 includes a plurality of panels 13. The plurality of panels 13 may include a first portion or cover 72 and a second portion or floor 74. The first portion 72 may include a first panel 76 and the second portion 74 may include a second panel 78. In certain other aspects, each of the first and second portions 72, 74 of the plurality of panels may include more than one panel, such as a pair of panels, as shown and as will be described in greater detail below. In certain other aspects, the plurality of panels 13 may include greater than or equal to two panels, optionally greater than or equal to three panels, optionally greater than or equal to four panels, optionally greater than or equal to five panels, optionally greater than or equal to ten panels, or optionally greater than or equal to fifteen panels.

The panels 13 may include or be constructed from a high-strength metal. The high-strength metal may include a steel, aluminum (e.g., aluminum, an aluminum alloy such as an alloy from the 6XXX series and/or 7XXX series including Al 6061, Al 6082, Al 6034, Al 6282, Al 7075, or a combination of aluminum alloys), or a combination of steel and aluminum. In certain aspects, the panels 13 may include a polymer composite material, either in combination with a metal or alone. A panel constructed out of a high-strength steel may have a material yield strength that is greater than or equal to about 900 MPa, optionally greater than or equal to about 1,000 MPa, or optionally greater than or equal to about 1,200 MPa. A panel constructed out of aluminum may have a material yield strength that is greater than or equal to about 200 MPa, optionally greater than or equal to about 300 MPa, or optionally greater than or equal to about 400 MPa.

Figure 1G:
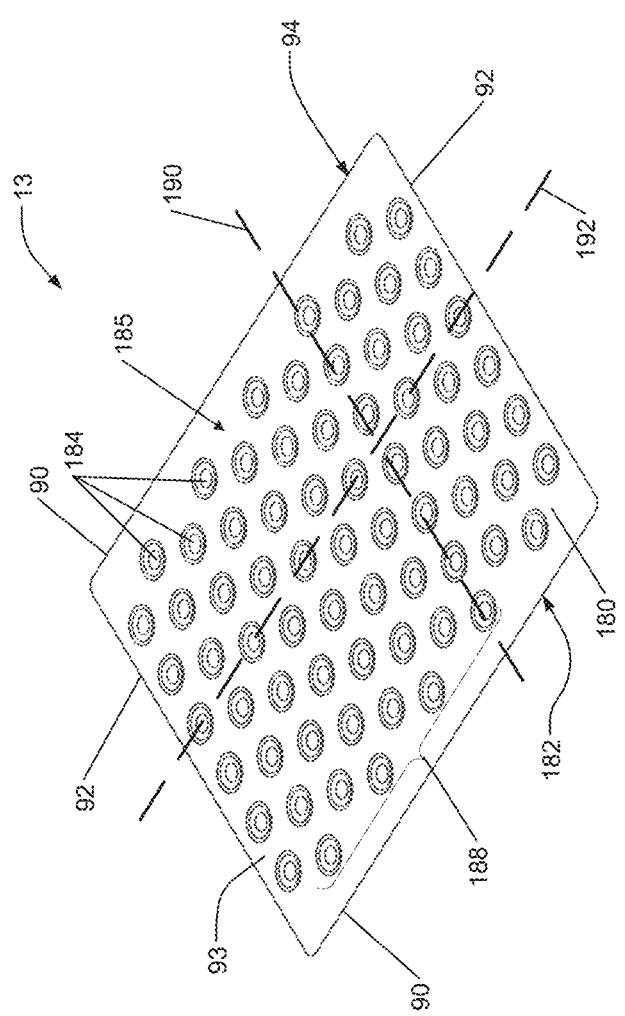
FIG. 1G is a perspective view of one of the plurality of panels of FIG. 1A.

In certain aspects, the plurality of panels 13 cooperate to support an external load of greater than or equal to about 10 kN. Referring to FIG. 1G, each of the panels 13 may include a pair of longitudinally-extending sides 90 and a pair of transversely-extending sides 92 (collectively referred to as the "sides 90, 92"). In certain aspects, at least a portion of the panels 13 may be substantially rectangular in shape, as shown. Each of the panels 13 may include a substantially planar body 93. The sides 90, 92 may cooperate to define an outer edge or periphery 94.

In certain other aspects, panels may include additional walls, such as side walls, that extend substantially perpendicularly from a substantially planar body and/or at least partially along a periphery (see, e.g., FIGS. 3A-3E). The side walls may optionally vary in dimension and/or shape. Panels may include additional walls and/or may have different geometries (e.g., shape), features (e.g., outer edges and/or flanges), and configurations as needed to meet desired structural and energy absorbing characteristics of the subassembly 10.

In certain aspects, each panel 13 may have an average thickness that is greater than or equal to about 0.5 mm to less than or equal to about 5 mm. In certain aspects, the thickness may be uniform across the panel 13. However, in certain other aspects, the thickness may vary as needed to provide structural support and/or strength at desired areas of the vehicle.

Returning to FIG. 1B, the first panel 76 and the second panel 78 may include or at least partially define footwell structures 110 and 112, respectively. The first panel 76 may be coupled to both a third panel 120 and a fourth panel 122. In certain aspects, the first panel 76 may be directly coupled to the third panel 120 and the fourth panel 122. The second panel 78 may be coupled to both a fifth panel 124 and a sixth panel 126. In certain aspects, the second panel 78 may be directly coupled to the fifth panel 124 and the sixth panel 126.

In certain other aspects, panels may be free of footwell structures (not shown) depending on desired vehicle packaging and/or configuration. For example, when panels are free of footwell structures, third and fourth panels may be integral to form a single panel, which may be directly coupled to the first panel, and fifth and sixth panels may be integral to form another single panel, which may be directly coupled to the second panel.

Returning to FIG. 1G, each panel 13 includes a first surface 180 and a second surface 182 opposite the first surface 180. The first surface 180 may include or define a plurality of depressions 184. In between the depressions 184, the body 93 may include a substantially planar region 185. The second surface 182 may include or define a plurality of protrusions 186 (shown in FIGS. 1B, 1H). Each of the depressions 184 and protrusions 186 may have a largest depth of greater than or equal to about 1 mm to less than or equal to about 10 mm. In certain aspects, the depressions 184 and protrusions 186 may optionally have a largest depth of less than or equal to about 30 mm, or optionally less than or equal to 20 mm.

In certain aspects, a shape of the protrusions 186 is complementary to a shape of the depressions 184. In certain aspects, a profile shape of the depressions and complementary protrusions may be symmetrical. In certain aspects, as shown, the depressions 184 and complementary protrusions 186 have a substantially circular profile shape. In certain aspects, the depressions 184 and complementary protrusions 186 may have a non-circular profile shape (see, e.g., the profile shapes of FIGS. 3A-3E). In certain other aspects, a panel may include only depressions, only protrusions, non-aligned protrusions and depressions, and/or non-complementary protrusions and depressions. In certain other aspects, a panel may be free of both depressions and protrusions (e.g., have a substantially planar surface).

An aggregation of the depressions 184 and complementary protrusions 186 may form a pattern 188. In certain aspects, the pattern may include a random distribution of profile shapes and be substantially asymmetric. In certain aspects, the pattern may have at least one plane of symmetry. In certain aspects, the pattern 188 may have at least two planes of symmetry (and optionally greater than two planes of symmetry). The pattern 188 may include a first plane of symmetry 190 and a second plane of symmetry 192. The first and second planes of symmetry 190, 192 may be substantially perpendicular. The panels 13 and patterns 188 may be formed by methods including hot stamping, cold stamping, roll forming a combination of hot stamping, cold stamping, and/or roll forming, or any other suitable method.

The pattern 188 may include substantially evenly-spaced circular depressions, as shown. In certain other aspects, all or a portion of panels in a subassembly may have different geometries (e.g., profile shapes, size) and/or arrangements (e.g., grouped together, spaced uniformly across the panel, or spread apart from one another) (see, e.g., FIGS. 3A-3E and accompanying discussion).

As a result of the first and second planes of symmetry 190, 192 of the pattern 188, each of the panels 13 may have an increased strength and/or stiffness in at least two directions (e.g., parallel to the first and second planes of symmetry 190, 192) compared to a panel without a pattern (e.g., a substantially flat panel consisting essentially of planar surfaces). In certain aspects, each of the panels 13 may have an increased strength and/or stiffness in greater than two directions (e.g., the pattern 188 has more than two planes of symmetry). In certain aspects, each of the first portion of panels 72 and the second portion of panels 74 may have an increased strength and/or stiffness in at least two directions compared to a portion of panels without a pattern (e.g. a portion of panels including substantially flat panels).

Each of the panels 13 may have the same pattern, such as the pattern 188 as shown. In certain other aspects, all or a portion of the panels in a subassembly may be different from the other panels of the structural subassembly. In certain other aspects, at least a portion of the panels in a subassembly may be free from a pattern. Any combination of panels including any combination of patterns may be utilized and arranged to provide desired strength, stiffness, and energy absorbing characteristics of the subassembly 10.

Referring back to FIG. 1B, the first portion of the panels 72, includes the first panel 76, the third panel 120, and the fourth panel 122. Each of the panels 76, 120, 124 includes the first surface 180 having the plurality of depressions 184 and the second surface 182 having the plurality of protrusions 186. Both of the third panel 120 and the fourth panel 122 may be oriented 180 degrees with respect to the first panel 76 such that the second surface 182 of the first panel 76 faces the second surface 182 of the third panel 120 and the second surface 182 of the fourth panel 122. Accordingly, the protrusions 186 of the first panel 76 are substantially aligned with the protrusions 186 of the third panel 120 and the protrusions 186 of the fourth panel 122. The surfaces 180, 182 of the second portion of the panels 74 may be oriented substantially similar to the first portion of the panels 72. The second portion of panels 74, includes the second panel 78, the fifth panel 124, and the sixth panel 126. Each of the panels 78, 124, 126 includes the first surface 180 having the plurality of depressions 184 and the second surface 182 having the plurality of protrusions 186. Both of the fifth panel 124 and the sixth panel 126 may be oriented 180 degrees with respect to the second panel 78 such that the second surface 182 of the second panel 78 faces the second surface 182 of the fifth panel 124 and the second surface 182 of the sixth panel 126. Accordingly, the protrusions 186 of the second panel 78 are substantially aligned with the protrusions 186 of the fifth panel 124 and the protrusions of the sixth panel 126.

Figure 1H:
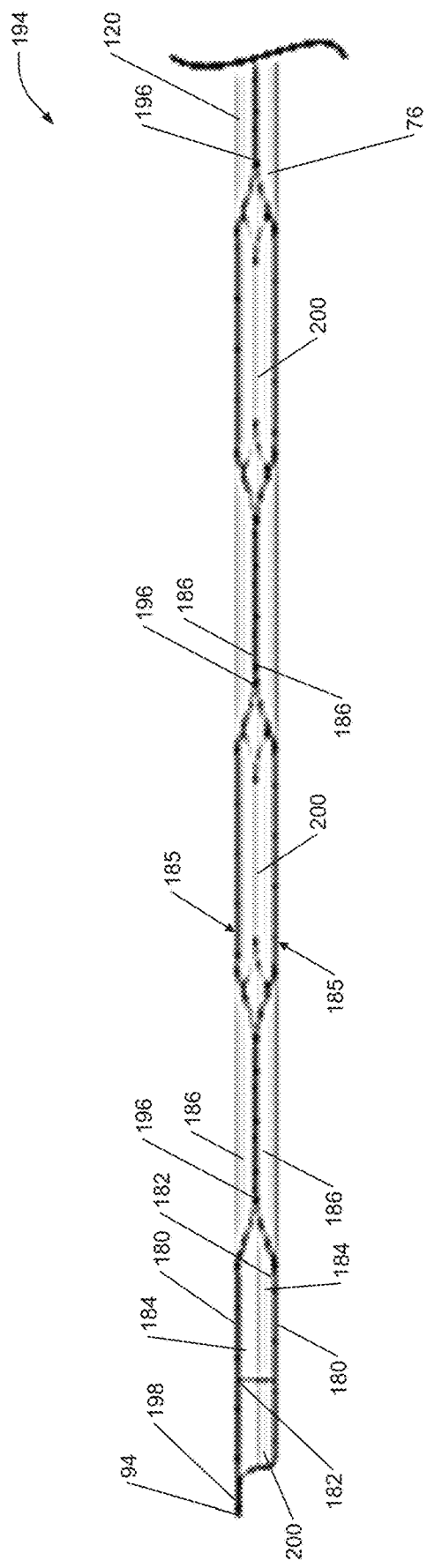
FIG. 1H is a partial cross-sectional view of the plurality of panels of FIG. 1 taken at line 1H-1H of FIG. 1A.
Figure 11:
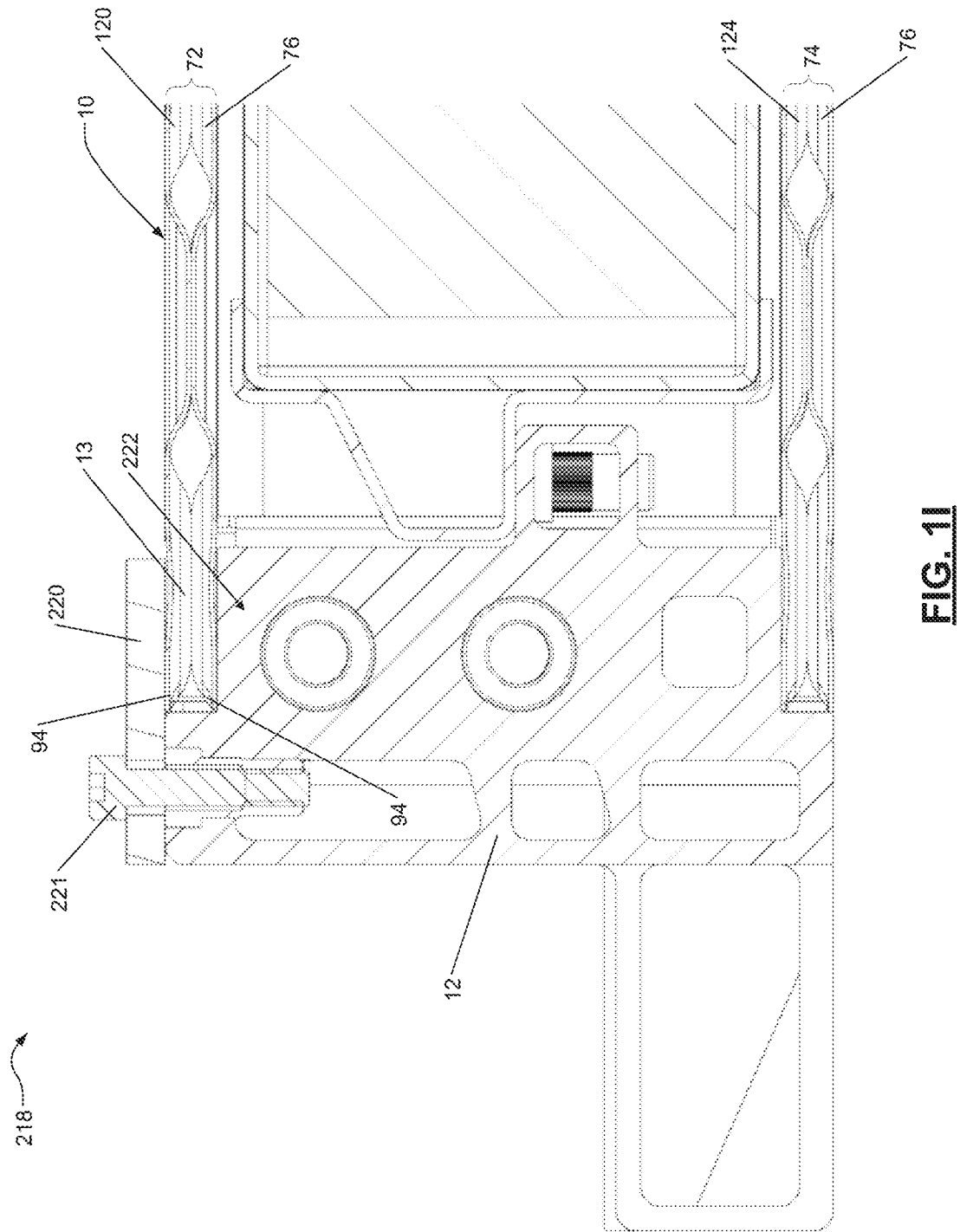

In certain other aspects, (not shown) both of the third panel 120 and the fourth panel 122 may be oriented in the same direction with respect to the first panel 76 such that the second surface 182 of the first panel 76 faces the first surface 180 of the third panel 120 and the first surface 180 of the fourth panel 122. Accordingly, the protrusions 186 of the first panel 76 are substantially aligned with the depressions 184 of the third panel 120 and the depressions 184 of the fourth panel 122. The surfaces 180,182 of the second portion of the panels 74 may be oriented substantially similar to the first portion of the panels 72. With reference to FIG. 1H, a panel subassembly 194 including the first panel 76, the third panel 120, and the fourth panel 122 (shown in FIG. 1B) is provided. The second surface 182 of the first panel 76 may be coupled to the second surface 182 of the third panel 120 and the second surface 182 of the fourth panel 122. In certain aspects, a portion of the second surface 182 of the first panel 76 may be directly coupled to a portion of the second surface 182 of the third panel 120 and the second surface 182 of the fourth panel 122. In certain aspects, the first panel 76 may be coupled to the third panel 120 (and the fourth panel 122, shown in FIG. 1B) by welds, an adhesive, or a combination of welds and adhesive. In certain aspects, the second surface 182 may be coupled at first interfaces 196 adjacent to peripheries of the protrusions 186 and/or second interfaces 198 adjacent to the edge 94. The planar regions 185 of the first panel 76 and the third panel 120 (and the fourth panel 122, shown in FIG. 1B) may cooperate to define a plurality of cavities 200. In other aspects, a first panel maybe coupled to additional panels. For example, the first panel may be disposed between a pair of panels to define cavities on both sides of the first panel. The second panel 78 may be coupled to the fifth and sixth panels 122, 124 in a similar manner as described above.

Returning to FIG. 1C, the subassembly 10 includes the plurality of panels 13 and the frame 12 (which may be coupled to one another as described in the discussions accompanying FIGS. 1I-1J), The plurality of panels 13 (including the first portion 72 and the second portion 74) may be at least partially disposed in the interior region 36 of the frame 12. In certain aspects the frame 12 may be substantially horizontally oriented to include a top side 202 and a bottom side 204. The first portion of the panels 72 may be attached to the top side of the frame 202 and the second portion of the panels 74 may be attached to the bottom side 204 of the frame 12. In certain other aspects, a frame may be substantially vertically oriented to include a right side and a left side with the first plurality of panels fixed to the right side of the frame and the second plurality of panels fixed to the left side of the frame. The plurality of panels may have alternative orientations and may be optimized in terms of position, geometry, and/or materials to meet desired structural, packaging, and loading characteristics of the subassembly 10.

Referring to FIG. 1I, a structural assembly 218 according to various aspects of the present disclosure is provided. The structural assembly 218 includes the subassembly 10 of FIGS. 1A-1H. In certain aspects, the frame 12 may cooperate with a plate 220 and a fastener 221 to secure the first portion of the panels 72 to the frame 12. More particularly, the first portion of the panels 72 may be clamped between a portion of the plate 220 and a portion 222 of the frame 12. The portion 222 may include a partial length of the frame sides 14, 16, or the entire length of the frame sides 14, 16. In certain aspects, the plate may cooperate with each of the sides 14, 16. In certain other aspects the plate 220 may cooperate with one pair of the sides (e.g., either the longitudinally extending sides 14 or the transversely extending sides 16). The plate 220 may apply a substantially uniform pressure to the panels 13. Such as in a region adjacent to the outer edges 94 of the panels. A relatively large surface area of the plate 220 may at least partially reduce and/or minimize stress concentrations compared to other types of fasteners. The second portion of the panels 74 may be secured to the frame 12 in other manners (e.g., by adhesive and/or welding), or clamped in a similar manner as described above with respect to the first portion 72 of the panels.

With reference to FIG. 1J, another structural assembly 268 according to various aspects of the present disclosure is provided. The structural assembly 268 includes the subassembly 10 of FIGS. 1A-1H. The first portion of the panels 72 may be coupled to the frame 12 by one or more fasteners 270. The fastener 270 may include a mechanical fastener. In certain aspects, the mechanical fastener includes a rivet nut, a screw, a bolt, an anchor, or any combination thereof. The second portion of the panels 74 may be secured to the frame 12 in other manners (e.g., by adhesive and/or welding), or by use of one or more mechanical fasteners in a similar manner as described above with respect to the first portion 72 of the panels.

In various aspects, the subassembly 10 (or structural assembly 218 or structural assembly 268) may be used to contain or support one or more vehicle components. In certain aspects, the subassembly 10 may at least partially enclose and/or support one or more electrochemical devices, such as a battery. In certain aspects, the subassembly 10 may at least partially enclose and/or support one or more components such as a battery disconnect unit (BDU), a busbar, a cooling panel, electrical wiring, or a combination thereof.

Figure 1K:
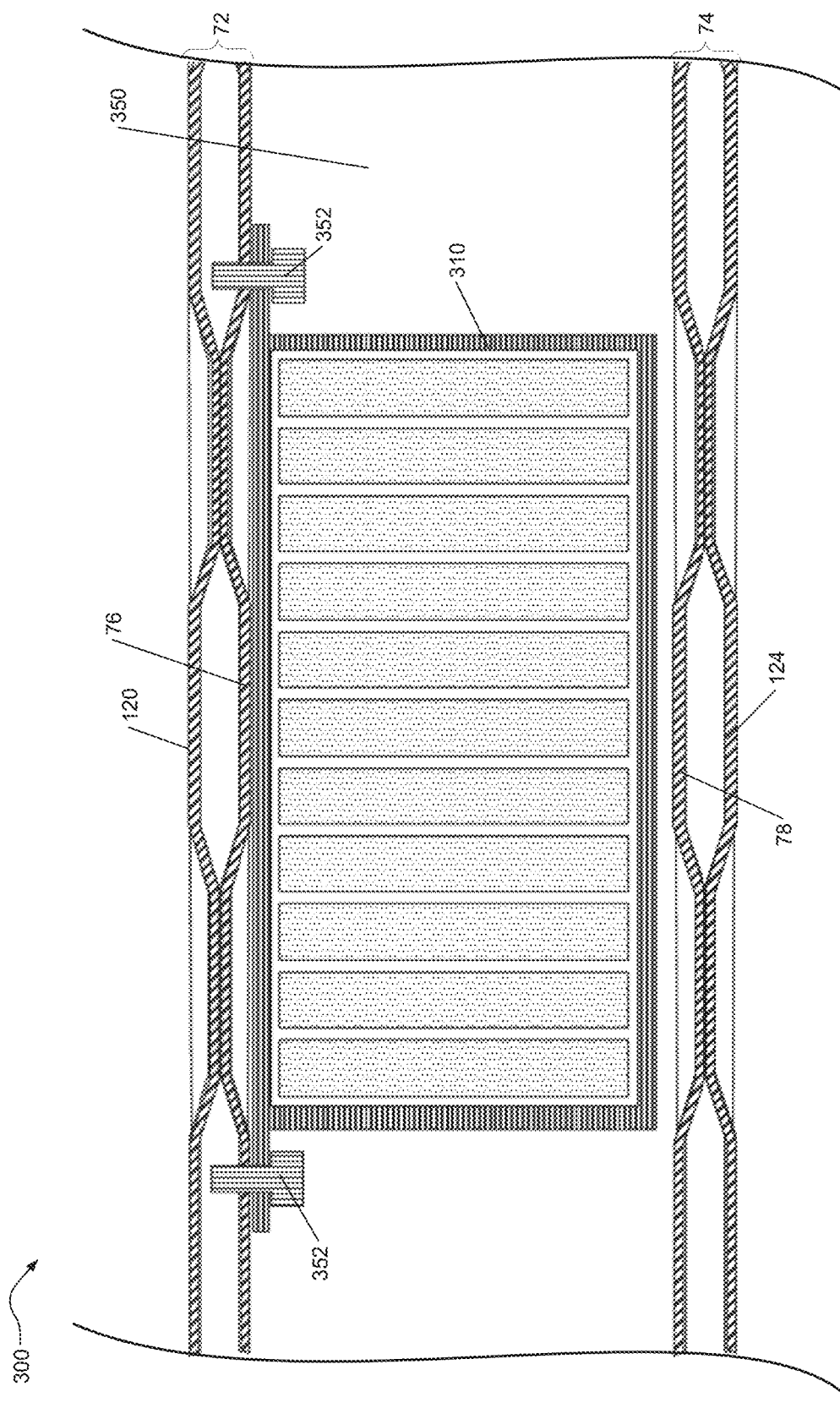
FIG. 1K is a partial cross-sectional view of a rechargeable energy storage system ("RESS") assembly including the subassembly of FIG. 1A according to various aspects of the present disclosure.

With reference to FIG. 1K, a rechargeable energy storage system ("RESS") assembly 300 according to various aspects of the present disclosure is provided. The RESS assembly 300 includes the subassembly 10 and an electrochemical device 310, such as a battery module. Electrochemical device 310 is contained at least partially within and/or supported by the subassembly 10. In certain aspects, the cover 72 and the floor 74 are oriented substantially horizontally.

The cover 72, floor 74, and frame 12 (shown in FIG. 1D) may cooperate to define an interior chamber 350. The electrochemical device 310 is disposed at least partially within the interior chamber 350. In certain aspects, the electrochemical device 310 is disposed fully within the interior chamber 350. In certain aspects, the electrochemical device 310 may be attached to the cover 72. The electrochemical device 310 may be attached to the cover 72 by one or more mechanical fasteners 352, as shown. Additionally or alternatively, the electrochemical device 310 may be attached to the cover by one or more welds and/or adhesive.

Additionally or alternatively, the electrochemical device 310 may be attached to the floor 74. The electrochemical device 310 may be attached to the floor 74 my by one or more mechanical fasteners, one or more welds, adhesive, or any combination thereof (not shown). Directly coupling the electrochemical device 310 to only one of the cover 72 or floor 74 may facilitate simple removal of the other of the cover 72 and the floor 74 from the RESS assembly 300.

According to certain aspects of the present disclosure, the assemblies 218 (shown in FIG. 1I), 268 (shown in FIG. 1J), and 300 (shown in FIG. 1K) may facilitate ease of serviceability or replacement of a component, such as the electrochemical device 310. In certain aspects, the cover 72 and/or the floor 74 may be removably coupled to the frame 12 (e.g., mechanically secured by a clamp and/or mechanical fastener, as shown in FIGS. 1I-1J). The RESS assembly 310 may be attached (e.g., bolted) to one of the cover 72 or the floor 74 and the other of the cover 72 and the floor 74 may be at least partially removable to provide access to a component, such as the electrochemical device 310, as shown in FIG. 1K. Removal of the mechanically fastened cover 72 or floor 74 may allow easier access to service or replace the component compared to removal of the entire structural assembly 300.

A structural assembly according to various aspects of the present disclosure may include the frame 12, as shown in FIGS. 1A-1F and 1I-1K, or another frame that differs from the frame 12 in terms of presence or quantity of supports, such as cross members, methods of manufacturing, materials of construction, shape, and/or dimensions. FIGS. 2A-2D depict other frames according to certain aspects of the present disclosure.

Figure 2A:
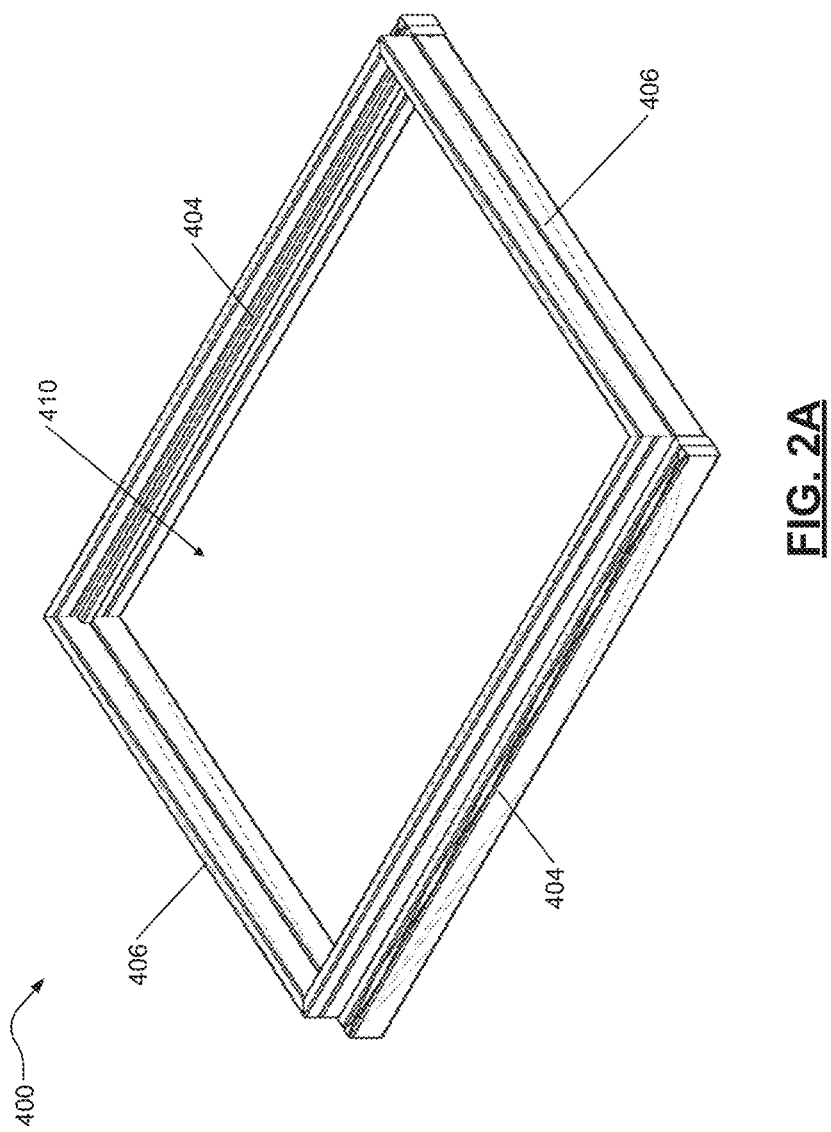
FIG. 2A is a perspective view of another frame according to various aspects of the present disclosure.

With reference to FIG. 2A, another frame 400 according to various aspects of the present disclosure is provided. The frame 400 may be the same as or similar to the frame 12 of FIGS. 1A-1F and 1I-1K except as otherwise described below. The frame 400 may include a pair of longitudinally-extending sides 404 and a pair of transversely-extending sides 406 (collectively referred to as "sides 404, 406"). The sides 404, 406 may at least partially define an interior region 410. In certain aspects, the frame 400 may be free of additional supports, such as cross members. The interior region 410 may be uninterrupted and continuous. In certain aspects, the frame 12 consists essentially of the sides 404, 406.

Figure 2B:
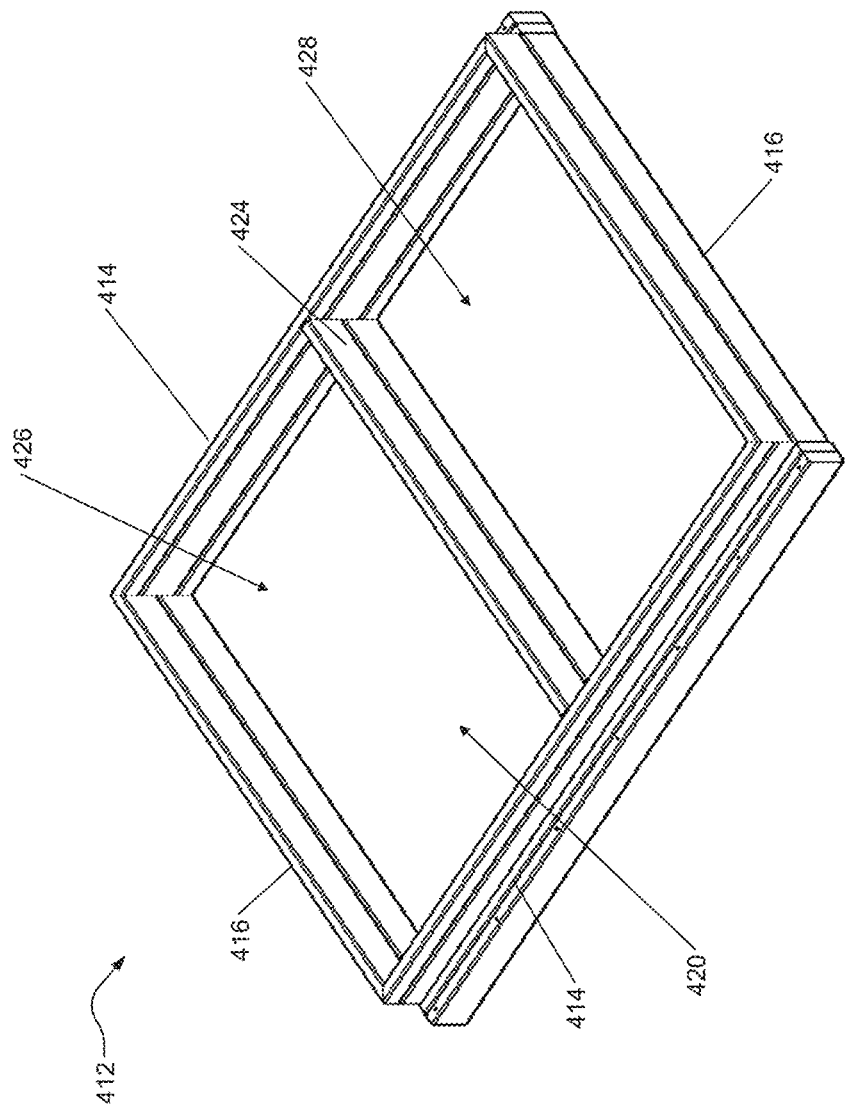
FIG. 2B is a perspective view of yet another frame according to various aspects of the present disclosure.

Referring to FIG. 2B, another frame 412 according to various aspects of the present disclosure is provided. The frame 412 may be the same as or similar to the frame 12 of FIGS. 1A-1F and 1I-1K except as otherwise described below. The frame 412 includes a pair of longitudinally-extending sides 414 and a pair of transversely-extending sides 416 (collectively referred to as "sides 414, 416"). The sides 414, 416 may at least partially define an interior region 420. In certain aspects, the frame 412 may include a single cross member 424.

The cross member 424 may be at least partially disposed in the interior region 420. The cross member 424 may divide the interior region into a first interior section or portion 426, and a second interior section or portion 428. The cross member 424 be secured to or integrally formed with the longitudinally-extending sides 414 and may extend substantially parallel to the transversely-extending sides 416. In other aspects, a cross member may be secured to or integrally formed with transversely-extending sides and extend substantially parallel to longitudinally-extending sides. Although the first and second interior portions 426, 428 are substantially equal in size and shape, a frame may have other configurations (e.g., different relative size of interior sections) and/or additional supports, such as cross members.

Figure 2C:
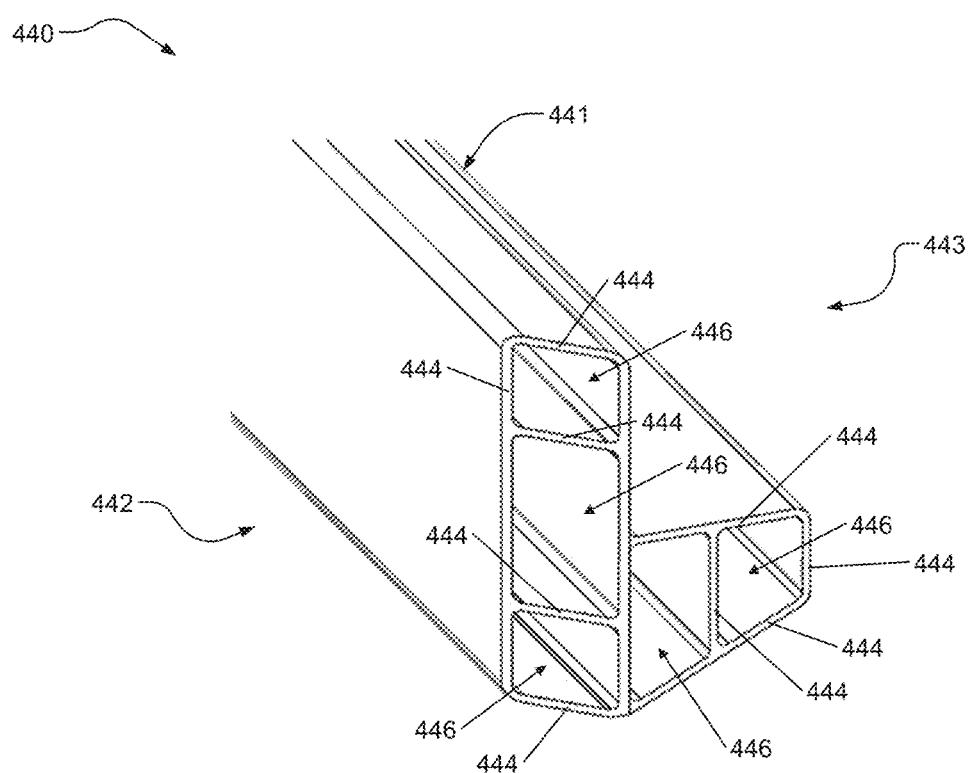
FIG. 2C is a partial cross-sectional view of a portion of another frame according to various aspects of the present disclosure.

With reference to FIG. 2C a partial cross-section of another frame 440 according to various aspects of the present disclosure is provided. The frame 440 may be the same as or similar to the frame 12 of FIGS. 1A-1F and 1I-1K except as otherwise described below. The frame 440 includes a plurality of sides 441 (e.g., longitudinally-extending sides and transversely-extending sides). The frame 440 may at least partially define an interior region 442 and an exterior region 443.

Each of the sides 441 may include a plurality of walls 444. The walls 444 may cooperate to at least partially define a plurality of elongated hollow regions 446. In certain aspects, the elongated hollow regions 446 may be substantially rectangular, trapezoidal, triangular, elliptical, or any combination thereof in cross sectional shape. In certain aspects, at least a portion of the elongated hollow regions 446 may share the walls 444.

Figure 2D:
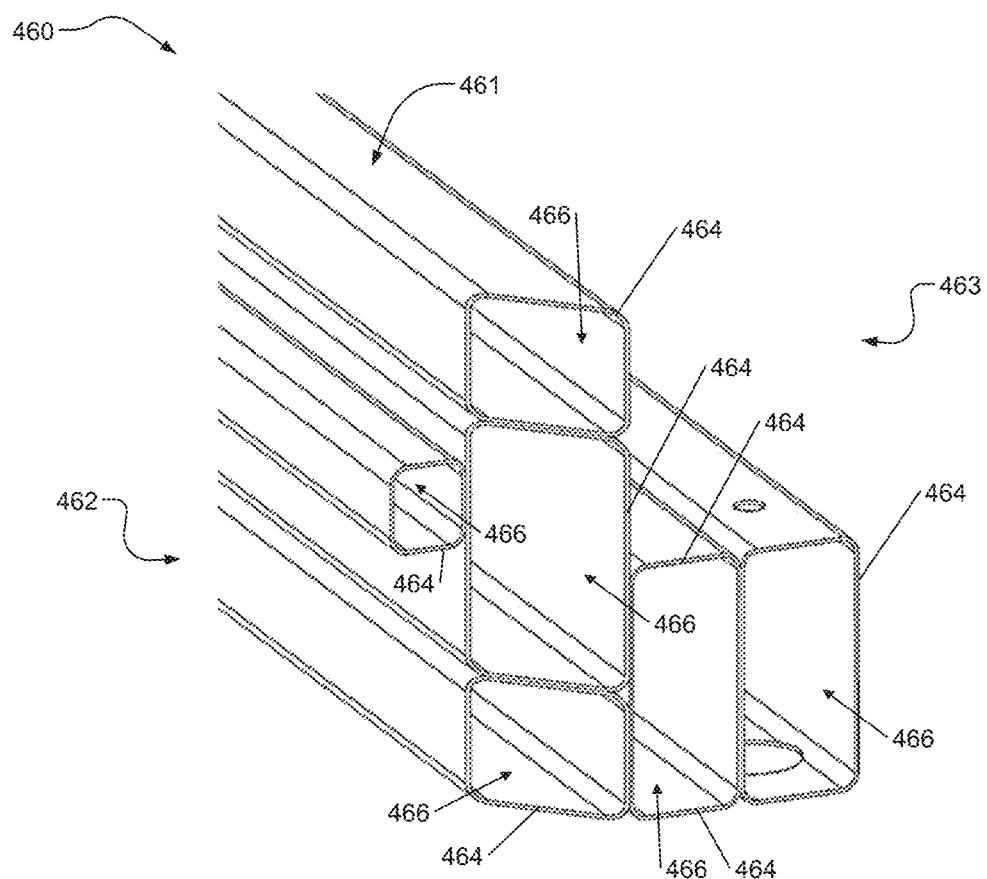
FIG. 2D is a partial cross-sectional view of a portion of another frame according to various aspects of the present disclosure.

Referring to FIG. 2D a partial cross-section of another frame 460 according to various aspects of the present disclosure is provided. The frame 460 may be the same as or similar to the frame 440 of FIG. 2C except as otherwise described below. The frame 460 includes a side 461. (e.g., longitudinally-extending sides and transversely-extending sides). The frame 460 may at least partially define an interior region 462 and an exterior region 463.

The side 461 may include a plurality of walls 464. The plurality of walls may cooperate to at least partially define plurality of elongated hollow regions 466. In certain aspects, at least a portion of the walls 464 are joined together (e.g., by welding) to form the side 461. In certain aspects, the each of the elongated hollow regions 466 may have distinct walls that are not shared with another of the elongated hollow regions 466.

A structural assembly according to various aspects of the present disclosure may include the panels 13, as shown in FIGS. 1A-1D and 1G-1K), or other panels that differ from the panels 13 in terms of geometry (shape of panel, inclusion of side or intermediate walls), methods of manufacturing, materials of construction, and/or protrusion and/or depression pattern. FIGS. 3A-3E depict other panels according to certain aspects of the present disclosure.

Figure 3B:
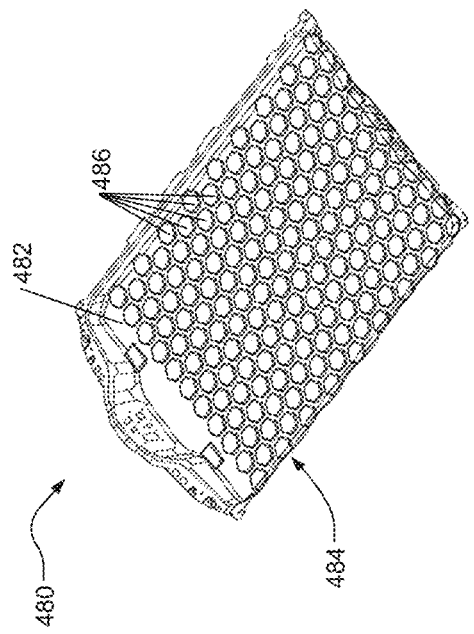
FIG. 3B is a perspective view of yet another panel according to various aspects of the present disclosure.

Protrusions and depressions may have any suitable shape, such as circles (FIG. 1G), diamonds (FIG. 3A), honeycombs (FIG. 3B), rectangles (FIG. 3C, 3E), an L-shape or other angled geometry (FIG. 3D), or any combination thereof, by way of example. In certain aspects, the depressions and protrusions may be asymmetric. In certain aspects, the depressions and protrusions may have at least one line of symmetry. In certain aspects, the depressions and protrusions may have at least two lines of symmetry (and optionally greater than two lines of symmetry). Protrusions and depressions may have substantially uniform spacing (FIGS. 1G, 3A-3D). In certain aspects, protrusions and depressions may have non-uniform spacing to facilitate tailored strength (FIG. 3E). The protrusions and depressions may be substantially the same in terms of shape and size across a panel. In certain aspects, a panel may have more than one shape and/or size of protrusions and/or depression. Moreover, a plurality of panels may include any combination of panels having the same or different patterns.

Figure 3A:
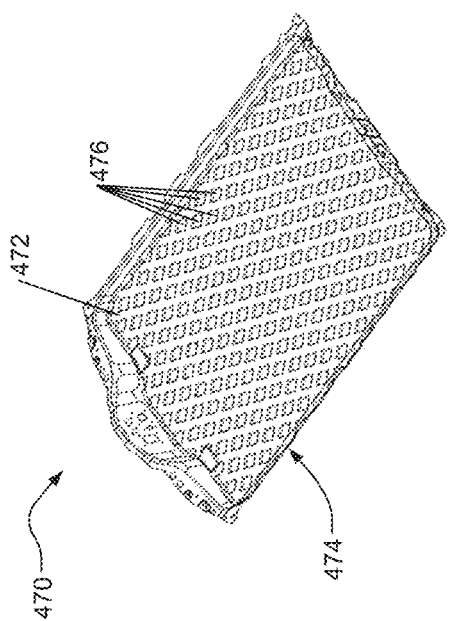
FIG. 3A is a perspective view of another panel according to various aspects of the present disclosure.
Figure 3D:
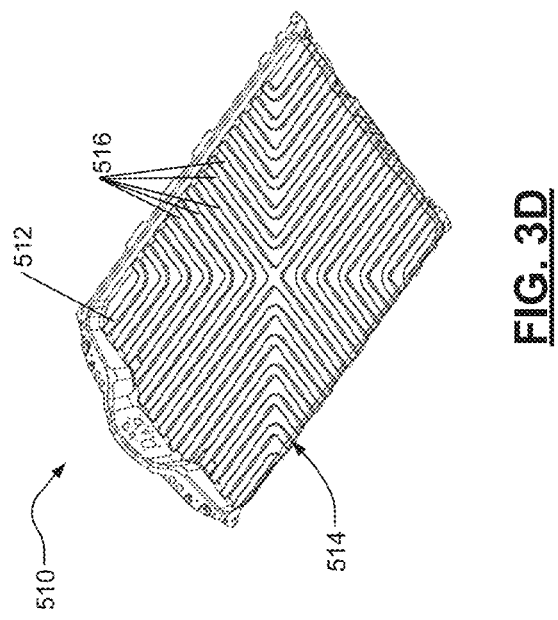
FIG. 3D is a perspective view of yet another panel according to various aspects of the present disclosure.

With reference to FIG. 3A, a panel 470 according to various aspects of the present disclosure is provided. The panel 470 may have a first surface 472 and a second surface 474 opposite the first surface. The first surface 472 may include or define a plurality of depressions 476. The second surface 474 may include or define a plurality of protrusions (not shown). A shape of the protrusions may be complementary to a shape of the depressions 476. In certain aspects, each of the depressions 476 and protrusions may define a substantially diamond-shaped profile.

Referring to FIG. 3B, a panel 480 according to various aspects of the present disclosure is provided. The panel 480 may have a first surface 482 and a second surface 484 opposite the first surface. The first surface 482 may include or define a plurality of depressions 486. The second surface 484 may include or define a plurality of protrusions (not shown). A shape of the protrusions may be complementary to a shape of the depressions 486. In certain aspects, each of the depressions 486 and protrusions may define a substantially honeycomb or hexagonal-shaped profile.

Figure 3C:
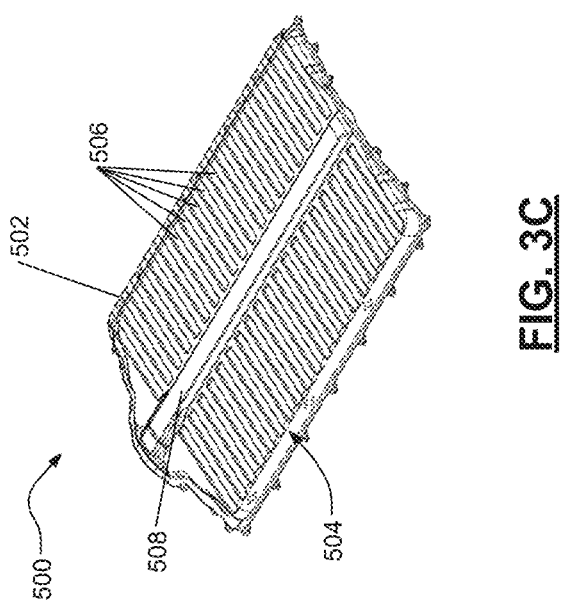
FIG. 3C is a perspective view of yet another panel according to various aspects of the present disclosure.
Figure 3E:
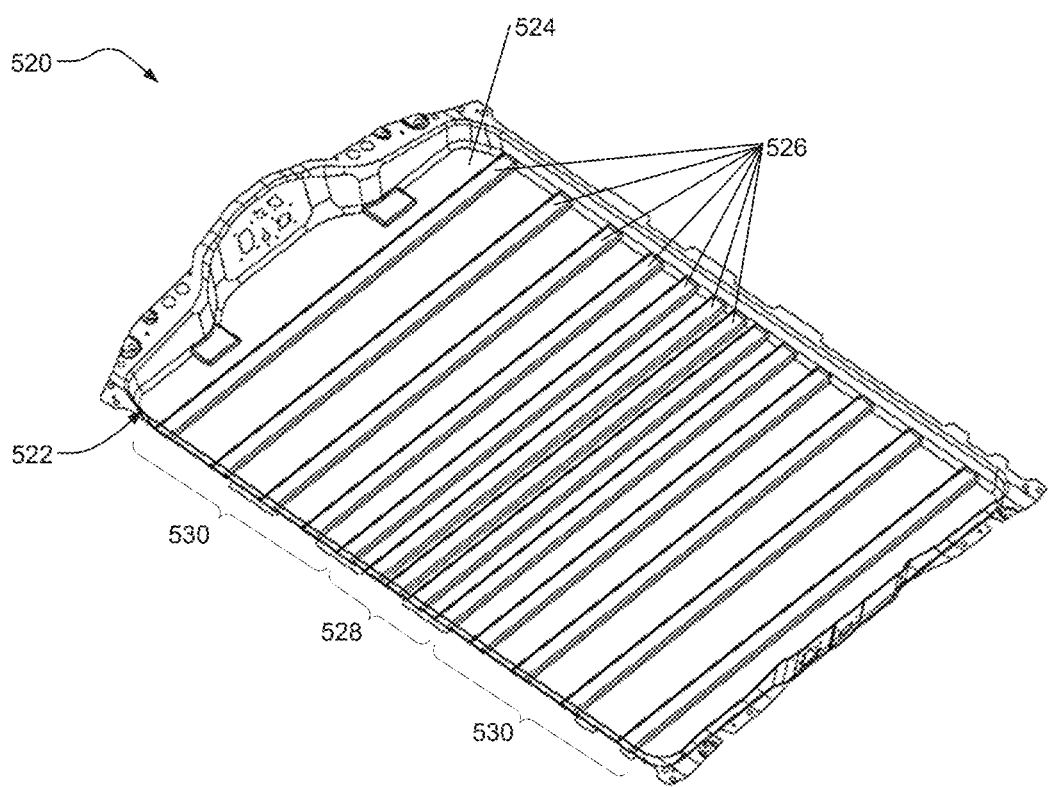
FIG. 3E is a perspective view of yet another panel according to various aspects of the present disclosure.

With reference to FIG. 3C, a panel 500 according to various aspects of the present disclosure is provided. The panel 500 may have a first surface 502 and a second surface 504 opposite the first surface. The first surface 502 may include or define a plurality of depressions 506. The second surface 504 may include or define a plurality of protrusions (not shown). A shape of the protrusions may be complementary to a shape of the depressions 506. In certain aspects, each of the depressions 506 and protrusions may define a substantially rectangular-shaped profile. In certain aspects, the depressions 506 and protrusions may cooperate to define a corrugated pattern.

In certain aspects, the panel 500 may further include a longitudinal ridge 508 that extends between and substantially perpendicular to the depressions 506 and protrusions. The longitudinal ridge 508 may protrude from the first surface 502 in an opposite direction from the depressions 506. The longitudinal ridge 508 may be present to meet packaging and/or strength requirements. In certain aspects, the panel 500 may be free of the longitudinal ridge 508 and the corrugated pattern may span substantially uninterrupted across the surfaces 502, 504.

Referring to FIG. 3D, a panel 510 according to various aspects of the present disclosure is provided. The panel 510 may have a first surface 512 and a second surface 514 opposite the first surface. The first surface 512 may include or define a plurality of depressions 516. The second surface 514 may include or define a plurality of protrusions (not shown). A shape of the protrusions may be complementary to a shape of the depressions 516. In certain aspects, each of the depressions 516 and protrusions may define a substantially L-shaped or angle-shaped profile. The panel 510 may have increased strength in at least two directions.

In various aspects, a panel may include substantially uniformly spaced depressions and protrusions, as shown in FIGS. 3A-3D. In various other aspects, a panel may include non-uniformly spaced protrusions and depressions to facilitate tailored strength. In other aspects, a panel may have a combination of uniformly and non-uniformly spaced depressions and protrusions.

With reference to FIG. 3E, another panel 520 according to various aspects of the present disclosure is provided. The panel 520 includes a first surface 522 and a second surface 524 opposite the first surface 522. The first surface 522 may include or define a plurality of depressions (not shown). The second surface 524 may include or define a plurality of protrusions 526. The protrusions 526 may be elongated or rectangular shaped and extend in a substantially transverse direction.

In certain aspects, the protrusions 526 may be spaced closer to one another in a first or central region 528 of the panel 520 and further from one another in second or outer regions 530 of the panel 520. The first region 528 may have a higher strength than the second region 530. A panel may include additional regions of higher or lower strength and/or a strength gradient.

Figure 4A:
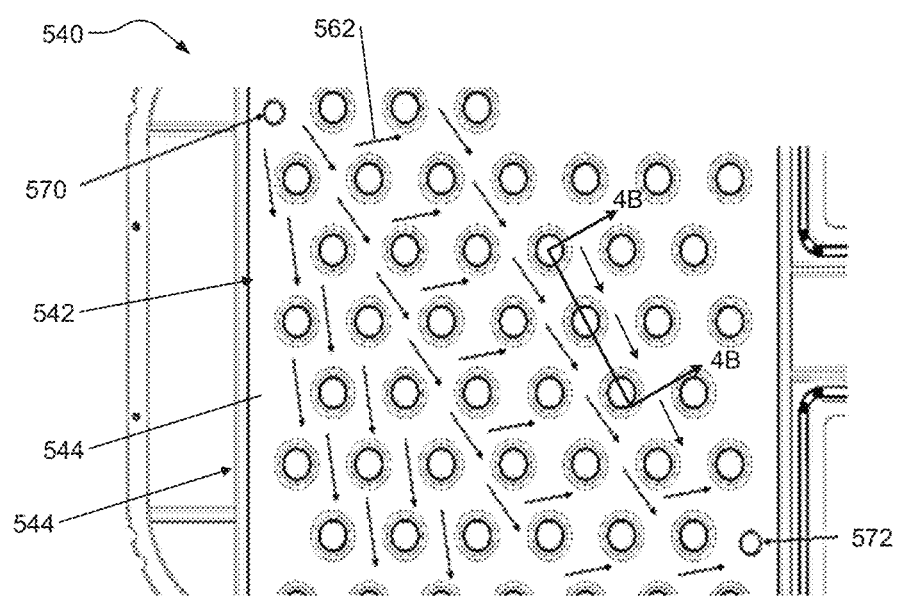
FIG. 4A is a partial top schematic view of a structural assembly including fluid venting according to various aspects of the present disclosure.
Figure 4B:
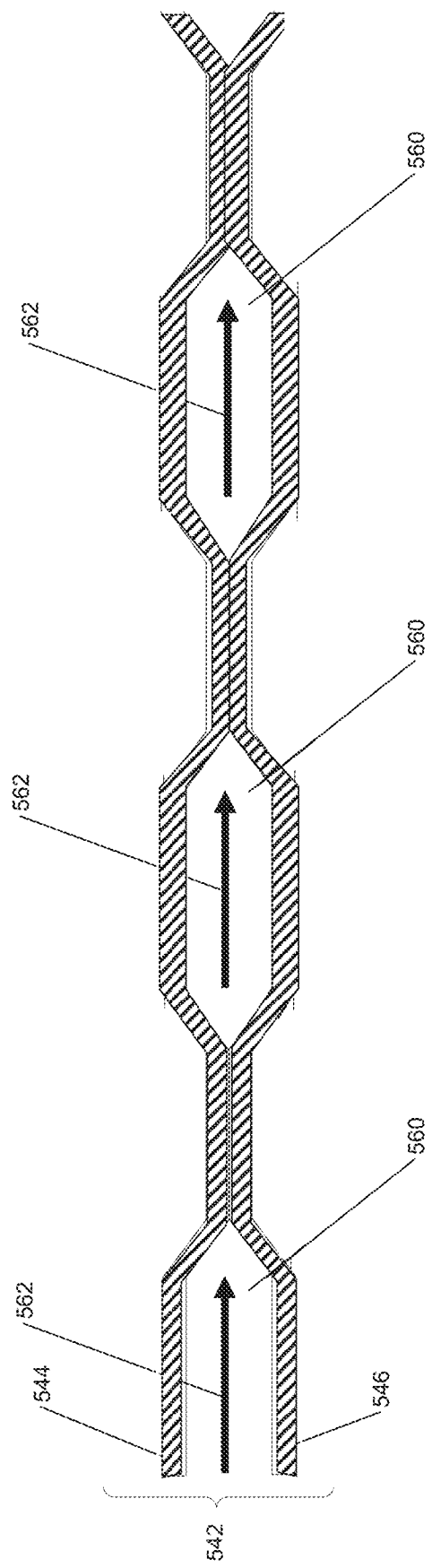
FIG. 4B is a partial cross-sectional view of the structural assembly of FIG. 4A taken at line 4B-4B of FIG. 4A.

In various aspects, the present disclosure provides a structural assembly configured to route and/or vent fluids. With reference to FIGS. 4A-4B, a structural assembly 540 according to various aspects of the present disclosure is provided. The structural assembly 540 includes a plurality of panels 542. The plurality of panels 542 may include a first panel 544 and a second panel 546 (FIG. 4B). The first and second panels 544, 546 may be the same or similar to the first and third panels 76, 120 of FIG. 1D except as otherwise described below. The first panel 544 may cooperate with the second panel 546 to at least partially define one or more cavities 560 (FIG. 4B).

In certain aspects, the cavities 560 may be configured to vent and/or route a fluid (e.g., air, gas). The panels 542 may include or define an inlet hole 570 and an outlet hole 572 (FIG. 4A). The fluid 562 may enter the cavities 560 at the inlet hole 570. The fluid 562 may be routed through the cavities 560 and exit at the outlet hole 572.

In various aspects, the present disclosure provides a structural assembly including a barrier material, such as a thermal barrier material, a noise insulating material, a stiffening material, or a combination thereof. In one example, a structural assembly according to certain aspects of the present disclosure at least partially encloses an electrochemical device (see, e.g., FIG. 1K). The structural assembly includes a thermal barrier material. Electrochemical devices may generate heat during operation. The thermal barrier material may facilitate a reduction in transfer of thermal energy between the electrochemical device, the structural assembly, and other vehicle components. In another example, a structural assembly according to certain aspects of the present disclosure may support a vehicle door or other body panel component. The structural assembly may include a noise insulating material. The noise insulating material may facilitate a reduction in noise, such as vibration or rattling of vehicle components when the vehicle is in motion. In another example, the structural assembly may include a stiffening material. The stiffening material may increase the overall strength and/or stiffness of the structural assembly in areas where a higher strength and/or stiffness is desired.

Figure 5:
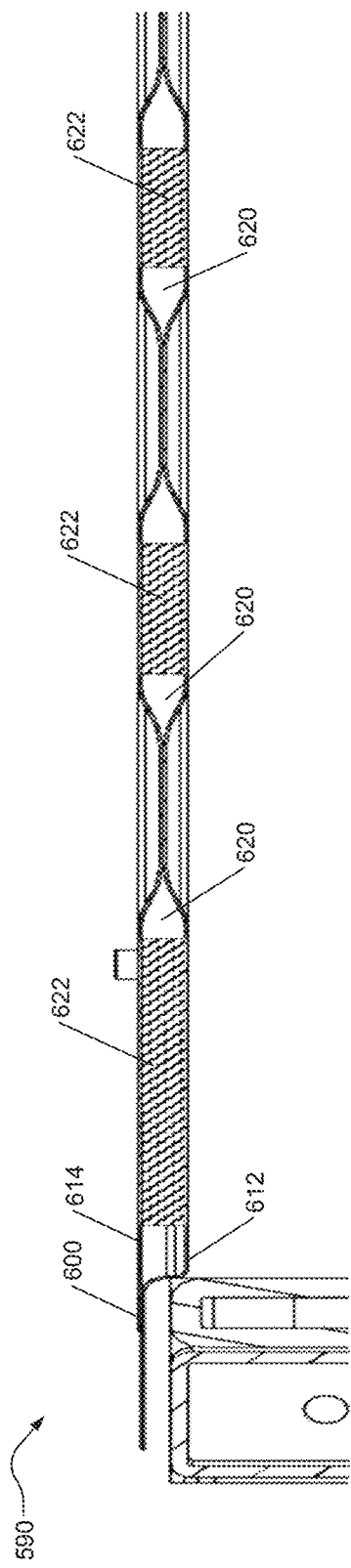
FIG. 5 is a partial cross-sectional view of structural assembly including a barrier material according to various aspects of the present disclosure.

With reference to FIG. 5, a structural assembly 590 according to various aspects of the present disclosure is provided. The structural assembly 590 includes a plurality of panels 600 the same as or similar to the plurality of panels 13 of FIGS. 1A-1D, 1G-1K. Accordingly, the plurality of panels includes a first panel 612 and a second panel 614. The first and second panels 612, 614 may cooperate to define one or more cavities 620.

A barrier material 622 may be present between one or more pairs of panels (e.g., within a floor and/or within a cover). In certain aspects, the barrier material 622 may be at least partially disposed in all or a portion of the cavities 620. The barrier material 622 may occupy all or a portion of each cavity. The barrier material 622 may include a thermal barrier material, a noise insulating material, or both a thermal barrier material and a noise insulting material. In certain aspects, the thermal barrier material may include intumescent foams, aerogels, or any combination thereof. In certain aspects, the noise insulating material may include a noise, vibration, and harshness (NVH) foam (e.g., suitable NVH tape, expandable NVH tape, or EPDM foam), other suitable sound deadening material, or both NVH foam and suitable sound deadening material.

As described above, a structural assembly according to various aspects of the present disclosure may be configured for easy and/or convenient access to an interior region, which may enclose and/or support a vehicle component. In some examples, the vehicle components include an electrochemical device. The electrochemical device may include a battery (e.g., a pouch cell or a can cell). In certain aspects, the structural assembly may enclose and/or support components such as a battery disconnect unit (BDU), a busbar, a cooling panel, electrical wiring, or a combination thereof. In certain aspects, the electrochemical devices may substantially fill an interior region of the structural assembly. In other aspects, the electrochemical devices may be present in only a portion of the interior region.

Figure 6B:
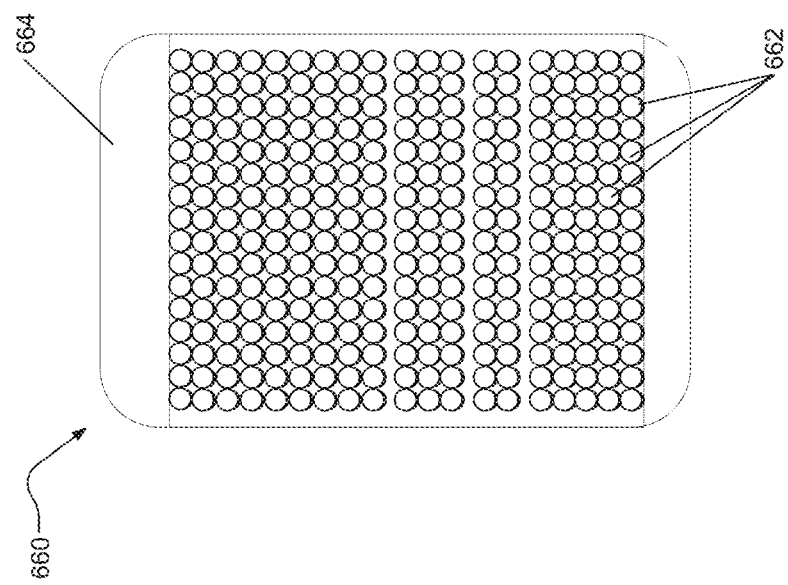
FIG. 6B is a top schematic view of another RESS assembly according to various aspects of the present disclosure.
Figure 6A:
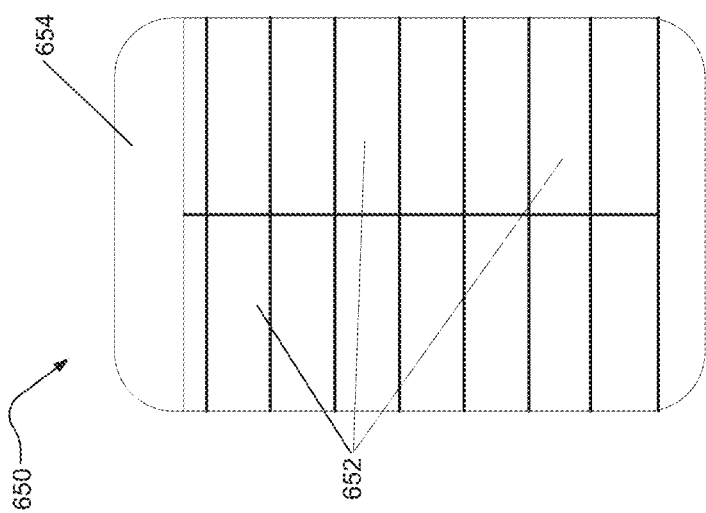
FIG. 6A is a top schematic view of a RESS assembly according to various aspects of the present disclosure.

With reference to FIG. 6A, a RESS assembly 650 according to various aspects of the present disclosure is provided. RESS assembly 650 may include a plurality of battery pouch cells 652. The RESS assembly 650 may further include a plurality of battery module housings (not shown) coupled to the pouch cells 652. The pouch cells 652 may substantially fill an interior region 654 of the RESS assembly 650. In other variations, a structural assembly may include another size of module and/or pouch cells (e.g., double wide module housings, or cell-2-pack configuration of pouch cells) or a combination of module and/or pouch cell sizes.

Referring to FIG. 6B, a RESS assembly 660 according to various aspects of the present disclosure is provided. The RESS assembly 660 may include a plurality of battery can cells 662. The can cells 662 may substantially fill an interior region 664 of the RESS assembly 660.

Figure 6D:
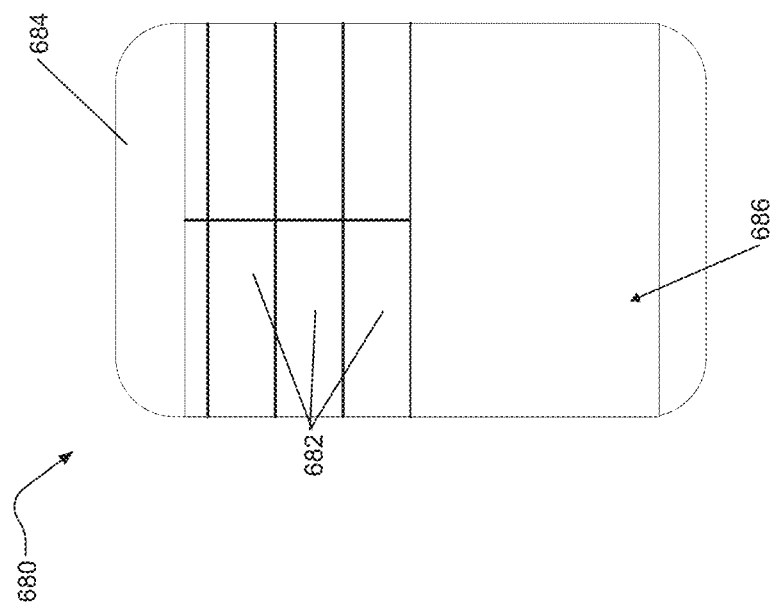
FIG. 6D is top schematic view of yet another RESS assembly according to various aspects of the present disclosure.
Figure 6C:
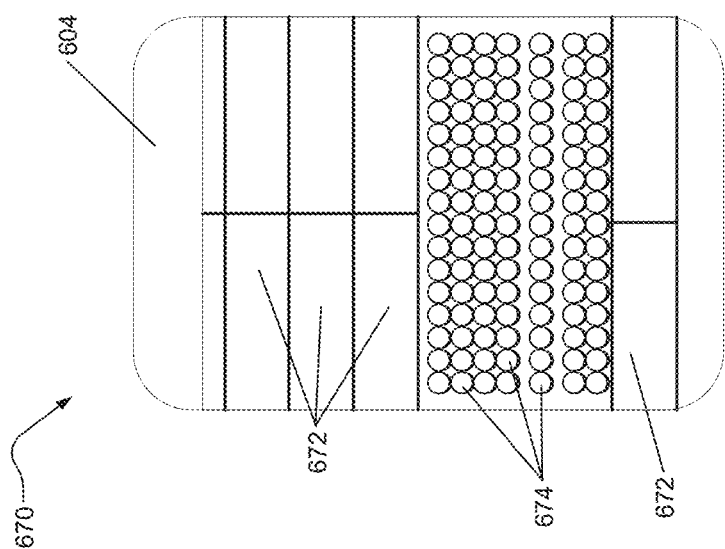
FIG. 6C is a top schematic view of yet another RESS assembly according to various aspects of the present disclosure.

With reference to FIG. 6C, a RESS assembly 670 according to various aspects of the present disclosure is provided. The RESS assembly 670 includes a plurality of battery pouch cells 672 (and optionally module housings) and a plurality of battery can cells 674. In certain aspects, the can cells 674 are disposed between two portions of the pouch cells 672.

Referring to FIG. 6D, a RESS assembly 680 according to various aspects of the present disclosure is provided. The RESS assembly 680 includes a plurality of pouch cells 682. The pouch cells 682 may occupy only a portion of an interior region 684 of the RESS assembly 680. Accordingly, the RESS assembly 680 may include an open region 686 (which is a portion of the interior region 684) that is free from electrochemical devices or other vehicle components. The open region 686 may allow individual vehicle owners to modify the RESS assembly 680 in after-sale service to include additional electrochemical devices, by way of example.

Figure 7:
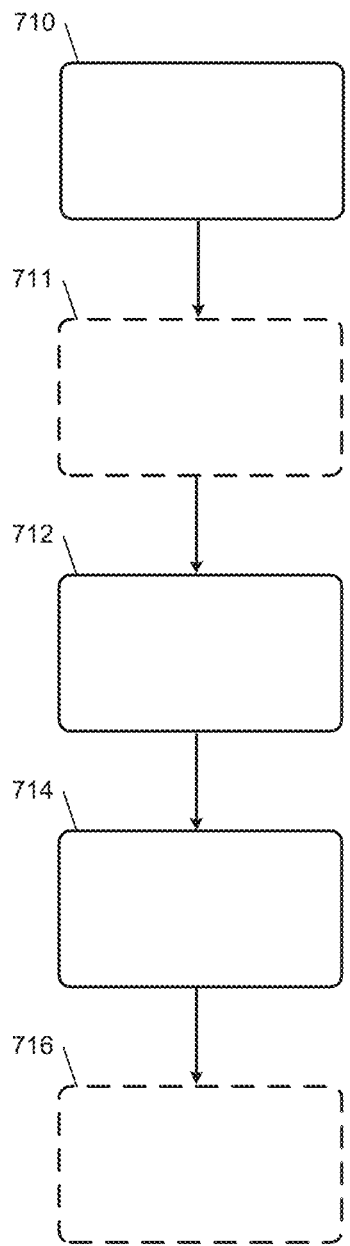
FIG. 7 is a flowchart depicting a method of manufacturing a structural assembly according to various aspects of the present disclosure.

In various aspects, the present disclosure also provides a method of manufacturing a structural assembly. With reference to FIG. 7, a method of manufacturing a structural assembly according to various aspects of the present disclosure is provided. The method may generally include: forming the panels at 710; optionally at least partially disposing a barrier material at least partially in between the panels at 711; coupling at least a portion of the panels to one another at 712; coupling the pluralities of panels to the frame at 714; and optionally disposing a vehicle component, such as an electrochemical device, in an interior region at 716.

At 710, the method includes forming the panels. In certain aspects, forming the panels includes a technique of hot stamping, cold stamping, rolling, or a combination of hot stamping, cold stamping, and/or rolling. In certain aspects, forming may further include creating a side wall that extends perpendicularly along a periphery of the panel. The side wall may be formed by drawing, extruding, roll forming, or any combination thereof.

At 711, the method includes at least partially disposing the barrier material on all or a portion of at least one of the panels. In one example, the barrier material may be at least partially layered adjacent to at least one of the panels.

At 712, the method includes coupling at least a portion of the panels to one another, such as to form a floor or cover. Coupling may include welding and/or adhering the panels to one another. In certain aspects, the coupling may include directly coupling a first panel to a second panel.

At 714, the method includes coupling the panels to a frame. The panels may be coupled to a frame using a mechanical fastener (e.g., by bolt), a clamp (e.g., a plate), a weld, adhesive, or any combination thereof. In certain aspects, as described above, certain methods of attachment, such as mechanical fasteners and clamps, may facilitate easy, quick, and/or convenient removal of one or more panels to provide access to an interior region of the structural assembly.

At 716, the method may include disposing an electrochemical device in an interior region of the structural assembly and coupling the electrochemical device to the structural assembly. For example, the electrochemical device may be coupled to a floor and/or a cover. A mechanical fastener, a weld, adhesive, or any combination thereof may be used to couple the electrochemical device to the structural assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structural assembly comprising:
   a frame comprising a wall at least partially defining an interior region; and
   a plurality of panels disposed at least partially in the interior region and coupled to the frame, the plurality of panels comprising,
      a first panel defining a substantially planar first body and comprising a first surface and a second surface opposite the first surface, the first surface defining a first plurality of depressions and the second surface defining a first plurality of protrusions complementary to the first plurality of depressions that together define a first pattern of discrete shapes distributed within the substantially planar first body, and
      a second panel coupled to the first panel, the second panel defining a substantially planar second body and comprising a third surface and a fourth surface opposite the third surface, the third surface defining a second plurality of depressions and the fourth surface defining a second plurality of protrusions complementary to the second plurality of depressions that together define a second pattern of discrete shapes distributed within the substantially planar second body, the first panel being coupled to the second panel.

2. The structural assembly of claim 1, wherein:
   the plurality of panels cooperate to define a first compressive strength in a first direction and a second compressive strength in a second direction;
   the plurality of panels is configured to support an external load of greater than or equal to about 10 kN.

3. The structural assembly of claim 1, wherein:
   the discrete shapes of the first pattern are circular shapes substantially evenly-spaced in the substantially planar first body, and
   the discrete shapes of the second pattern are circular shapes substantially evenly-spaced in the substantially planar second body.

4. The structural assembly of claim 3, wherein at least one of the first pattern and the second pattern define at least two planes of symmetry.

5. The structural assembly of claim 1, wherein the first pattern is different from the second pattern.

6. The structural assembly of claim 1, wherein the plurality of panels further comprises a third panel disposed at least partially in the interior region and coupled to the frame, the third panel comprising a fifth surface and a sixth surface, the fifth surface defining a third plurality of depressions and the sixth surface defining a third plurality of protrusions complementary to the third plurality of depressions.

7. The structural assembly of claim 6, wherein the plurality of panels further comprises a fourth panel disposed at least partially in the interior region and coupled to the frame, the fourth panel comprising a seventh surface and an eighth surface, the seventh surface defining a fourth plurality of depressions and the eighth surface defining a fourth plurality of protrusions complementary to the fourth plurality of depressions, the fourth panel being coupled to the third panel.

8. The structural assembly of claim 1, wherein the first panel and the second panel respectively define a pair of longitudinally-extending sides each coupled to the frame by: a clamp, a weld, adhesive, a mechanical fastener, or any combination thereof.

9. The structural assembly of claim 1, wherein the first panel and the second panel cooperate to define a cavity.

10. The structural assembly of claim 9, wherein the cavity is configured to vent a fluid.

11. The structural assembly of claim 9, further comprising a material disposed in the cavity, the material being selected from the group consisting of: a thermal barrier material, a noise insulating material, a stiffening material, or a combination thereof.

12. The structural assembly of claim 1, wherein the first panel and the second panel comprise a high-strength steel, a high-strength aluminum, or both a high-strength steel and a high-strength aluminum.

13. The structural assembly of claim 1, wherein:
   each of the plurality of panels has an average thickness that is greater than or equal to about 0.5 mm to less than or equal to about 5 mm, and
   each of the first plurality of depressions and the second plurality of depressions has a maximum depth that is greater than or equal to about 1 mm to less than or equal to about 10 mm.

14. A method of manufacturing a structural assembly, the method comprising:
   forming a plurality of panels by hot stamping, the plurality of panels comprising a first panel defining a first surface pattern, a second panel defining a second surface pattern, a third panel defining a third surface pattern, and a fourth panel defining a fourth surface pattern;
   forming a floor by welding the first panel to the second panel;
   forming a cover by welding the third panel to the fourth panel; and coupling the cover and the floor to a frame with a mechanical fastener, the cover and the floor being spaced apart to at least partially define an interior compartment.

15. The method of claim 14, further comprising:
disposing an electrochemical device in the interior compartment.

16. The method of claim 15, further comprising:
directly coupling the electrochemical device to exactly one of the cover and the floor, wherein the other of the cover and the floor is removable.

17. A structural assembly comprising:
a frame comprising a wall at least partially defining an interior region; and
a plurality of panels disposed at least partially in the interior region and coupled to the frame, the plurality of panels comprising,
   a first panel comprising a first surface and a second surface opposite the first surface, the first surface defining a first plurality of depressions and the second surface defining a first plurality of protrusions complementary to the first plurality of depressions,
   a second panel coupled to the first panel, the second panel comprising a third surface and a fourth surface opposite the third surface, the third surface defining a second plurality of depressions and the fourth surface defining a second plurality of protrusions complementary to the second plurality of depressions, the first panel being coupled to the second panel,
   a third panel disposed at least partially in the interior region and coupled to the frame, the third panel comprising a fifth surface and a sixth surface, the fifth surface defining a third plurality of depressions and the sixth surface defining a third plurality of protrusions complementary to the third plurality of depressions, and
   a fourth panel disposed at least partially in the interior region and coupled to the frame, the fourth panel comprising a seventh surface and an eighth surface, the seventh surface defining a fourth plurality of depressions and the eighth surface defining a fourth plurality of protrusions complementary to the fourth plurality of depressions, the fourth panel being coupled to the third panel, wherein:
the first panel and the second panel cooperate to define a floor,
the third panel and the fourth panel cooperate to define a cover, and
the floor and the cover are spaced apart and cooperate with the frame to define an interior compartment.

18. An electrochemical device assembly comprising:
the structural assembly of claim 17; and
an electrochemical device, wherein:
the cover, the floor, and the frame cooperate to define an interior compartment, and
the electrochemical device is disposed in the interior compartment.

19. The electrochemical device assembly of claim 18, wherein the electrochemical device is coupled to at least one of the cover and the floor.

20. The electrochemical device assembly of claim 18, wherein the electrochemical device is coupled to the cover and the floor is removable.

* * * * *